United States Patent
Ryner et al.

(10) Patent No.: US 12,446,484 B1
(45) Date of Patent: Oct. 21, 2025

(54) SEED INJECTOR SYSTEM

(71) Applicant: Reenvision Ag, LLC, Nora Springs, IA (US)

(72) Inventors: Jayson Ryner, Nora Springs, IA (US); Wes Tremmel, Nora Springs, IA (US); Anthony Riesen, Nora Springs, IA (US); Andy Hill, Nora Springs, IA (US)

(73) Assignee: Reenvision Ag, LLC, Nora Springs, IA (US)

( * ) Notice: Subject to any disclaimer, the term of this patent is extended or adjusted under 35 U.S.C. 154(b) by 1030 days.

(21) Appl. No.: 17/380,619

(22) Filed: Jul. 20, 2021

Related U.S. Application Data

(60) Provisional application No. 63/156,996, filed on Mar. 5, 2021, provisional application No. 63/053,768, filed on Jul. 20, 2020.

(51) Int. Cl.
*A01C 5/04* (2006.01)
*A01C 7/10* (2006.01)

(52) U.S. Cl.
CPC .............. *A01C 5/04* (2013.01); *A01C 7/105* (2013.01)

(58) Field of Classification Search
CPC .. A01C 5/04; A01C 7/105; A01C 5/00; A01C 7/102; A01C 7/10; A01C 7/08; A01C 7/00
See application file for complete search history.

(56) References Cited

U.S. PATENT DOCUMENTS

| | | | | |
|---|---|---|---|---|
| 554,669 A | * | 2/1896 | Field | A01C 5/02 111/106 |
| 1,477,097 A | * | 12/1923 | Cowden | A01C 7/18 111/89 |
| 3,972,294 A | * | 8/1976 | Grundstrom | A01C 11/02 111/91 |
| 4,388,035 A | * | 6/1983 | Cayton | A01C 11/025 111/104 |
| 4,637,328 A | * | 1/1987 | Topham | A01C 21/002 221/265 |
| 4,760,807 A | * | 8/1988 | Keller | A01C 7/02 111/92 |

* cited by examiner

*Primary Examiner* — Christopher J. Novosad
(74) *Attorney, Agent, or Firm* — David M. Breiner; BrownWinick Law Firm

(57) ABSTRACT

Example embodiments of the invention include a dibbler comprising a body having a seed entrance aperture configured to receive a seed, a seed exit aperture configured to allow the seed to exit the body, and a first channel configured allow the seed to travel from the seed entrance aperture to the seed exit aperture. In one nonlimiting example embodiment the dibbler includes a push pin and a gate slidingly connected to the body to cover and expose the seed exit aperture, wherein the body includes a second channel configured to allow the push pin to push the seed through the seed exit aperture.

2 Claims, 39 Drawing Sheets

CLOSED

OPEN

SEED INJECTOR SYSTEM

CROSS-REFERENCE TO RELATED APPLICATIONS

This application claims with benefit of U.S. Provisional Patent Application No. 63/053,758 filed with the United States Patent and Trademark Office on Jul. 20, 2020, the entire contents of which are herein incorporated by reference. This application also claims with benefit of U.S. Provisional Patent Application No. 63/156,996 filed with the United States Patent and Trademark Office on Mar. 5, 2021, the entire contents of which are herein incorporated by reference.

BACKGROUND

1. Field

Example embodiments relate to a seed injector system.

2. Description of the Related Art

Over the centuries, many tools have been devised to aid man in the cultivation of the soil. Included as examples are hand-operated rakes, hoes, and plows used to disrupt, smooth and provide uniformity to soils to prepare them for seeding. Employing uniform seeding conditions usually results in plants that will mature close in time to other plants planted at the same time, providing uniformity for harvest activities. To achieve this uniformity, multi-row versions of rakes, hoes, and plows were devised for efficiency; first pulled by oxen or other animals, and later pulled by small tractors to prepare the soil for seeding. Over the centuries, farmers have come to understand that planting conditions are crucial to yield. And today, monolithic tractors pull planters that often simultaneously plant 36 rows or more. Still, there is room for improvement.

Seed dibblers were devised centuries ago. In general, a seed dibbler is used to create an indentation in the soil of appropriate size and depth in which to plant the intended seed. Ancient seed dibblers were as simple as a sharp stick carried by a worker; the worker simply stabbed the sharp end into the ground to a desired depth, then dropped in the seed, and covered the seed with dirt. However, human error and carelessness relative to seed spacing and seed depth resulted in uneven growth and ripening and difficulty in harvesting efficiently. Later, farmers began to understand that planting all seeds at the same depth meant most would emerge and ripen at the same time. They also began understanding that planting too deep would hamper germination and growth, too shallow may not allow enough protection from birds or insects or be too hot for germination. Seed dibblers were adjusted accordingly but as fields became larger in size, the inefficiencies of planting by hand using seed dibblers became too high to tolerate.

In order to provide more uniform planting and manage uniformity in planting while planting larger fields with less manpower and time, seed dibblers of a bit more complexity were devised. For example, a disc or wheel having an outer circumference upon which were mounted a plurality of evenly spaced stakes of uniform length could be rolled along a row leaving generally uniform openings in the soil into which seeds could be dropped and then covered. Often, this process was a three-person operation: opening, dropping in seed, and closing the opening. In addition to being labor intensive and time consuming, the process lacked uniformity due to human error; that lack in planning uniformity, in turn, produced a lack in harvest uniformity. Without uniformity, efficiency in these processes suffered.

As time went on, planting machines were devised that were wheeled and pulled first by horses and, later, by tractors. As planters were developed they were assembled to provide planting more than a single row at a time. Early planters comprised an assembly that opened a row, applied seed, and closed the soil over the seed. A row opener was typically a shovel or plow point, the planter was pulled by a horse or small tractor, planting one or two rows simultaneously by including a container for seeds followed by a disc or shovel (row closer) to cover the seed with soil. Then, as multiple-row planters were developed; they included multiple row assemblies so that multiple rows could be opened, planted, and closed all in one pass of the planter. In some embodiments, each row assembly was associated with a single main seed box from which seeds are distributed through a seed singulator to each row assembly or a seed box associated with each row assembly Each row assembly typically included a row opener often in the form of discs or shovels to prepare the soil for the seed, a seed singulator to separate and deliver the seed to the opened row, and closers which moved soil back over the seeds to close the row. In short, the basic row assembly was equipped to both open the row via a shovel or disc opener on the planter placed ahead of the seed source, to cover the seed using a row closer behind the seed source. Shovels were eventually mostly replaced by disk openers. As shown, disk openers are positioned at the forward part of the planter each opener providing uniform soil disruption labeled a row. Disc openers provide a uniform bed and depth for the seed. This uniformity is necessary in order to provide fields where plants mature simultaneously and can be harvested en masse.

The prior art planter was equipped with a supply or supplies of seed in one or more seedboxes; seeds were then delivered from the seedbox through the seed tube to an opened row. The planter further included the row closer following the seed tube thereby closing the row by moving soil back into the opened row and over the seeds.

But even row assemblies such as described herein were unable to provide the uniformity of spacing, seed depth, and row closure that would result in plants maturing more uniformly for more efficient and successful fertilizer application and effectiveness, pesticide application and effectiveness, or uniform readiness for harvest. Without higher consistency in planting, such uniformity in harvest could not be achieved. At today's prices for seeds, equipment, and chemicals, farmers need every possible seed to germinate and grow.

Disc openers were simple and efficient and, combined with seed singulators, seemed to offer more advantages at the time they were devised than most other available means for planting, especially in large scale operations. But the soil compaction caused by the shovel or disc opener reduced yield. What was needed was a way to eliminate or minimize compaction of the furrow while retaining the other efficiencies gained by use of a modern, multi-row planter and its more exact seed spacing.

SUMMARY

The present disclosure addresses many of the shortcomings of the prior art planting devices. Specifically, the disclosure provides a planting system having far higher levels of uniformity in planting by providing means to more precisely control placement of seed in the soil relative to spacing and depth of seed and remove or at least reduce the negative effects of soil compaction on seed germination. The present disclosure presents planting devices that employ one or more novel seed dibblers each operable to precisely insert the seed into the soil at uniform depth and spacing.

BRIEF DESCRIPTION OF THE DRAWINGS

Example embodiments are described in detail below with reference to the attached drawing figures, wherein.

DETAILED DESCRIPTION

Figure 1:
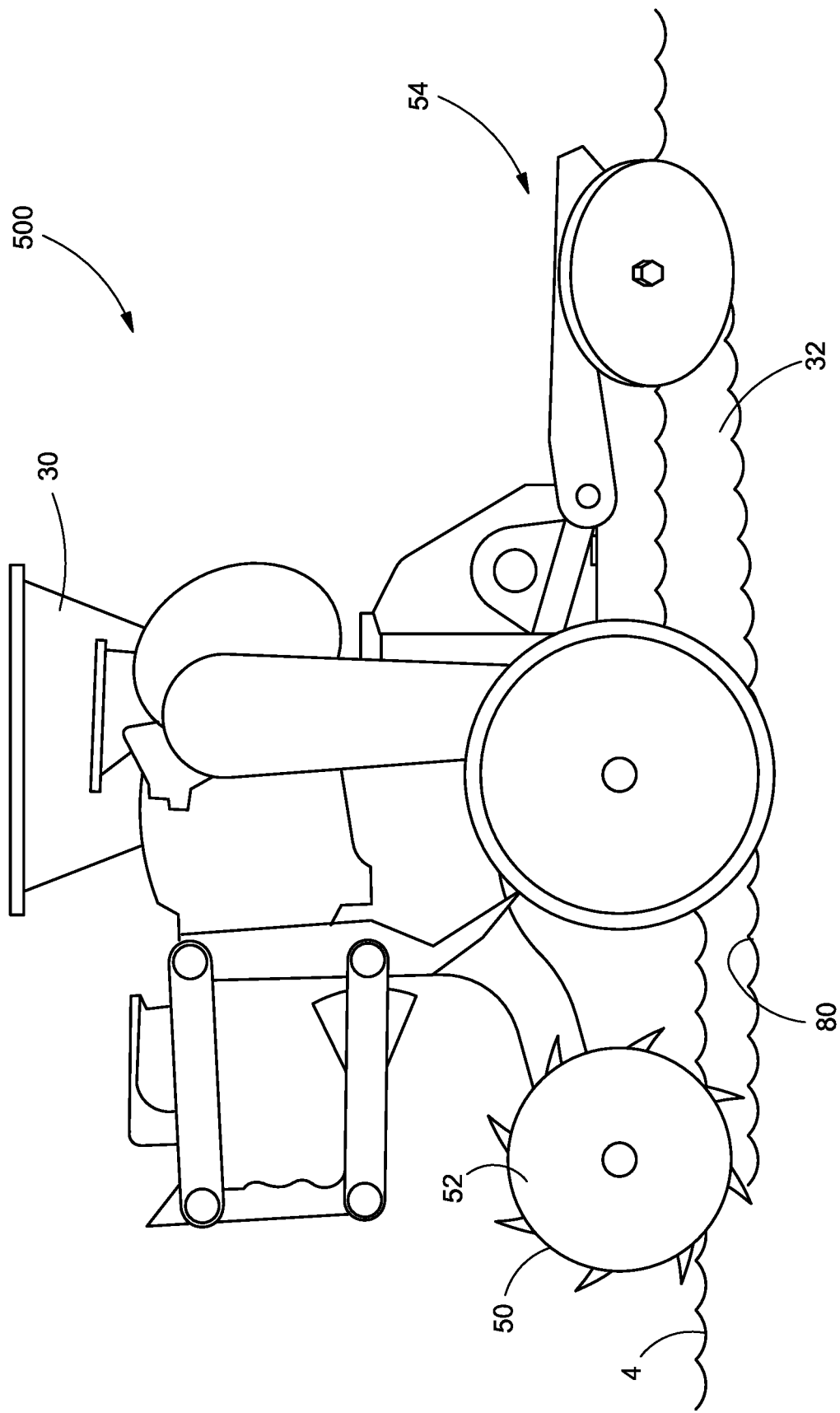
FIG. 1 is a diagram of a prior art row assembly.

Example embodiments will now be described more fully with reference to the accompanying drawings. Example embodiments are not intended to limit the disclosure since the disclosure may be embodied in different forms. Rather, example embodiments are provided so that this disclosure will be thorough and complete, and will fully convey the scope of the disclosure to those skilled in the art. In the drawings, the sizes of components may be exaggerated for clarity.

In this application, when a first element is described as being "on" or "connected to" a second element, the first element may be directly on or directly connected to the second element or may be on or connected to an intervening element that may be present between the first element and the second element. When a first element is described as being "directly on" or "directly connected to" a second element, there are no intervening elements. In this application, the term "and/or" includes any and all combinations of one or more of the associated listed items.

In this application, spatially relative terms merely describe one element's relationship to another. The spatially relative terms are intended to encompass different orientations of the structure. For example, if a first element of a structure is described as being "above" a second element, the term "above" is not meant to limit the disclosure since, if the structure is turned over, the first element would be "beneath" the second element. As such, use of the term "above" is intended to encompass the terms "above" and "below". The structure may be otherwise oriented (rotated 90 degrees or at other orientations) and the spatially relative descriptors used herein interpreted accordingly.

Example embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Example embodiments relate to systems and methods for planting.

Figure 4:
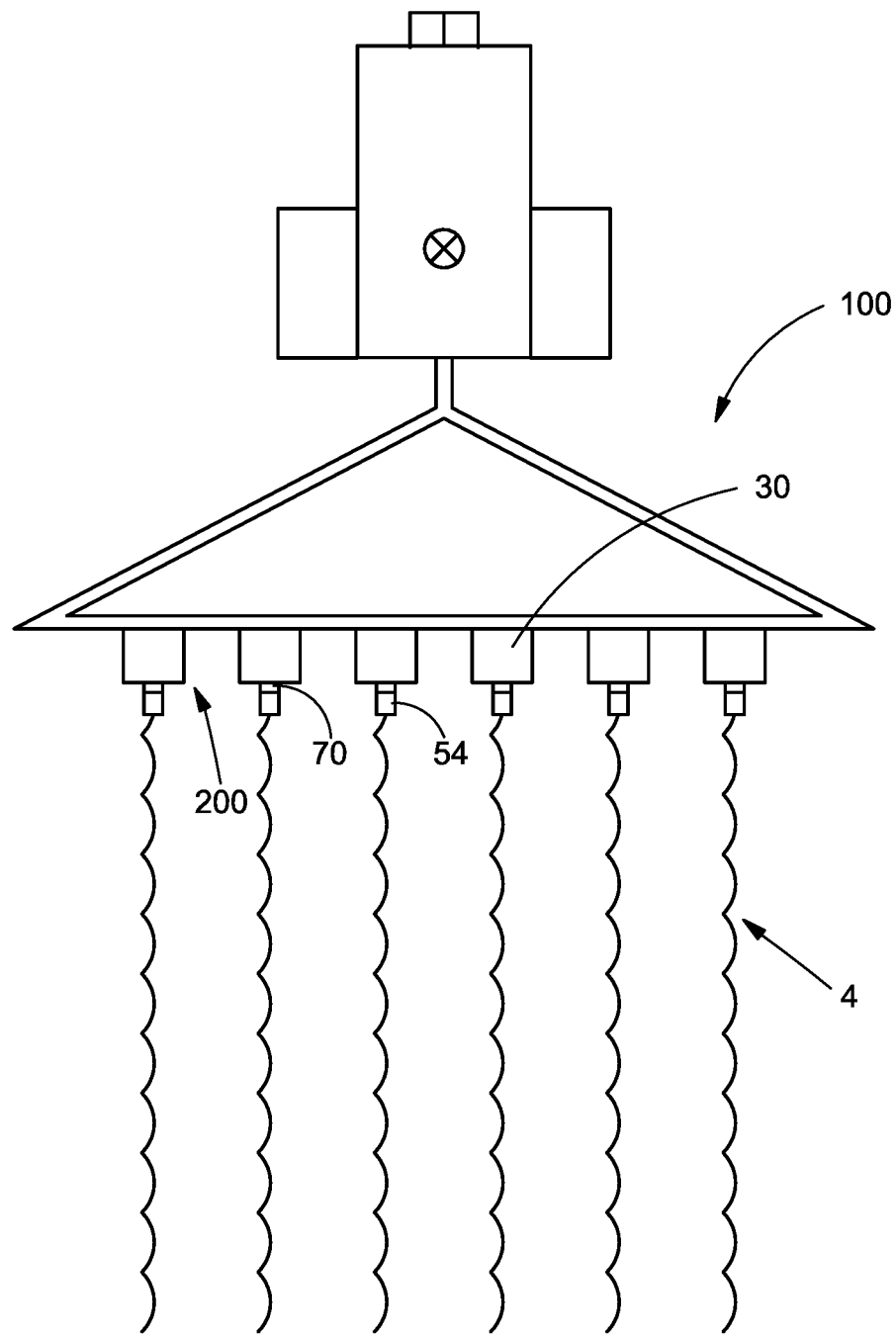
FIG. 4 is a diagram of a prior art planter and row boxes.

The Prior Art. As previously described, prior art modern planters typically include at least one seed box 30, and sometimes a seed box 30 associated with each row 4 (See FIGS. 1 and 4). Today, planters are designed with certain objectives: efficiency met by planting multiple rows 4 simultaneously; covering seeds 20 in a way that fosters uniform germination; and achieving consistent harvest timing. Electronic monitors provide precise understanding and predictability of seed spacing 36 and depth 82. Automated planting machinery has been devised that incorporates multi-row cultivator/planters that open a row 4 via disc openers 50 moving through the soil to create a furrow or opened row 32, followed by a seed dispensing mechanism or planter unit 500 equipped to place seeds 20 within the furrow or opened row 32, followed by a row closing implement 54, e.g., a coulter. While these modern planters are often equipped with electronic monitors to maintain seed planting depth 82 and spacing 36 to provide precision placement of seed 20, the use of the disc row openers 50 prior to seed 20 placement continues to introduce another problem. Specifically, as the row opener 50 is moved through the soil 80 to create the furrow or opened row 32, the soil 80 in the furrow 32 often becomes compacted. Disc openers 50 typically include a pair of disks 52, each rotatably mounted and positioned quite near to and at an angle to one another such that during operation, the disks 52 rotate through the soil 80 compacting it to leave a furrow 32 into which seeds 20 may be placed. When seeds 20 are placed in the furrow 32 with compacted soil, some seeds 20 may not germinate, or may germinate unpredictably relative to the rest of the field due to that compaction, negatively effecting yield. Even after a row closer 54 passes, some or all of the soil 80 compacted by the disks remains compacted.

Figure 5:
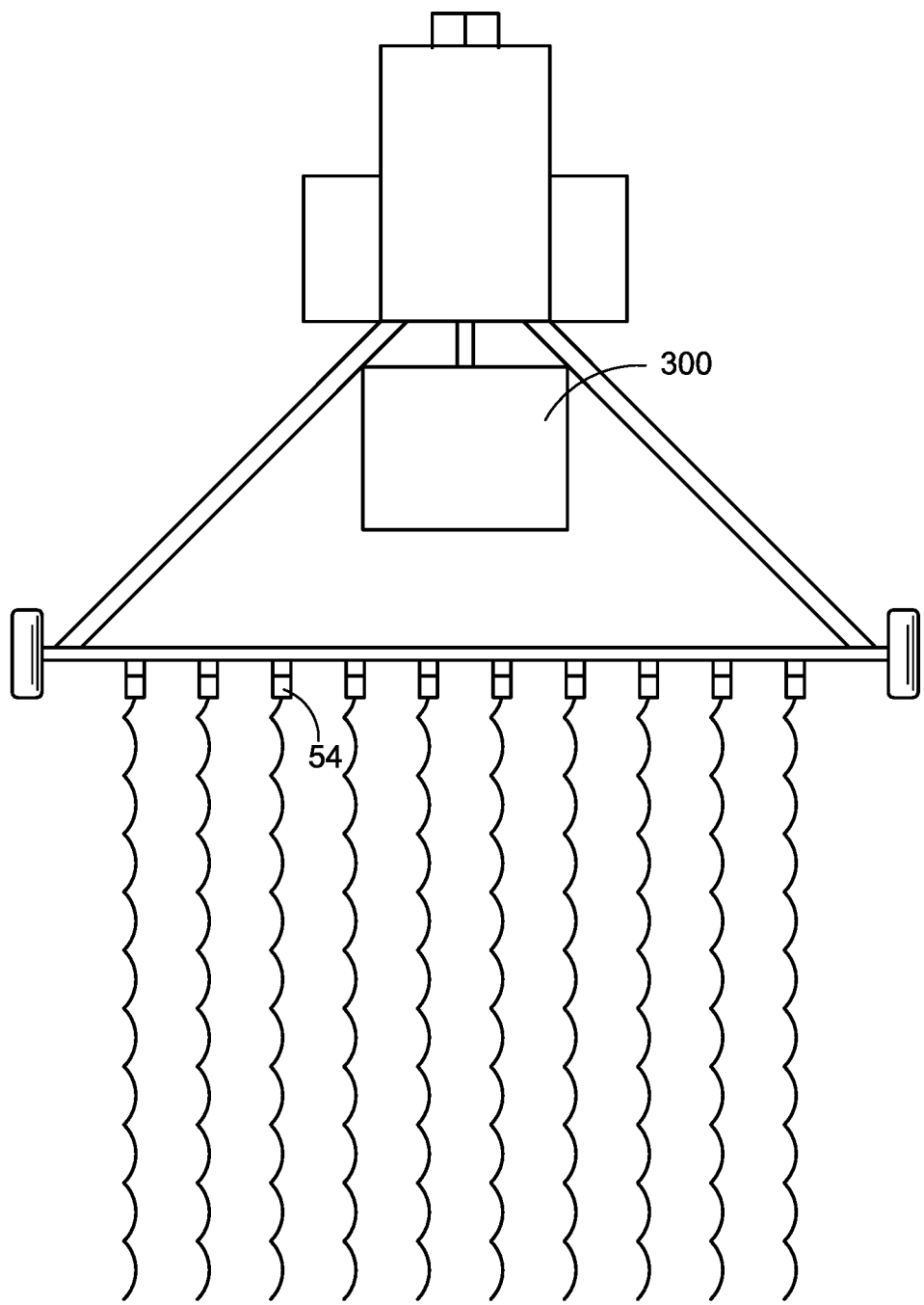
FIG. 5 is a diagram of prior art planter with a single main seed box.
Figure 8:
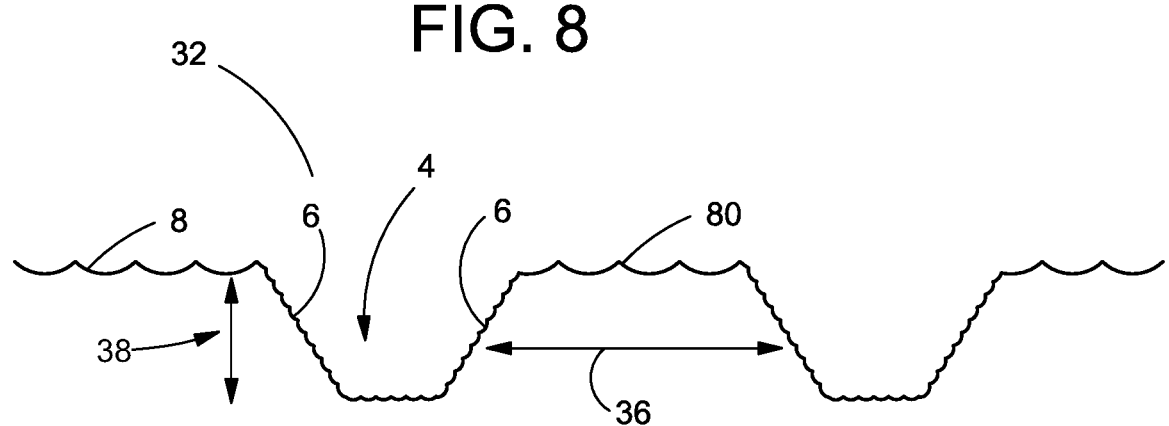
FIG. 8 is a cross section view of contours of two rows.
Figure 9:
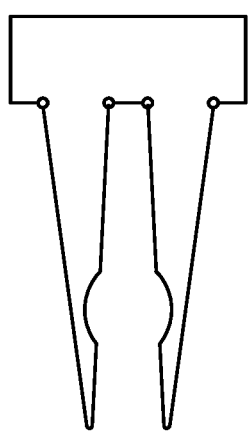
FIG. 9 is a view of a dibbler.

FIG. 1 illustrates a prior art planter row assembly 500 comprising a seed box 30 associated with a row opener 50 and a row closer 54. In the prior art, the planter row assembly is typically associated with each row 4 to be planted. In the prior art, each row assembly 500 includes the row opener 50 that travels ahead of the seed box 30 The row opener 50 creates a row 4 with sides 6 (see FIG. 8) into which seeds 20 are planted. The row assembly 500 may comprise a seed tube (not shown) to accept and then distribute seed 20 either from a seed box 30 dedicated to that row 4 or from a main seed box 300 providing seed to all the row assemblies simultaneously. The per row seed box 30 (see FIG. 4) is typically followed by a row closer 54. The seed box 30 is associated with or includes a seed singulator 70 that ensures that seeds 20 are conveyed from the seed box 30 to the row 4 at a selected rate that, combined with the speed of travel of the planter 10, provides optimal spacing 36 of seeds 20 (See FIG. 8). Either a single seed box 300 FIG. 5) may be employed and equipped to deliver seeds 20 to each and all of the row assemblies 500 via seed conduits and at a rate timed with the speed of the planter 10 to achieve the desired spacing of the plants, or each row may be provided its own seed box 30 FIG. 4. In either the seed box per row embodiment or the single seed box for many rows embodiment, the row closer(s) 54 following the seed box 30 or 300 causes soil 80 to be moved to cover the seed 20 at an appropriate depth 82 to encourage germination and growth, while offering protection from predators. However, prior art planters' row openers 50 often comprise a pair of discs 52 angled relative to one another such that upon travel through the soil 15*a* depression or opened row 32 is created into which seed 14 may then be placed, thereafter followed by a row closer 54 to cover the seeds with soil. But this arrangement creates an additional problem. The travel of the angled discs of the typical row opener 50 not only open a row 32, they also compact the sides 6 (see FIG. 8) of the opened row 32; this compaction, in turn, causes difficulty for seeds 14 to be correctly placed in the soil 15 which results in a lower seed germination rate and, therefore, lower yields. Further, prior art planters that comprise a single seed box 300 to distribute seed to multiple row assemblies (see FIG. 5) employ means to singulate the seeds, and direct each seed to a seed tube through which the seeds free-fall to the soil; as the seed free-falls it may bounce against the seed tube which, in turn, results in less than uniform seed depth and spacing. There was a need for an assembly that would place seed without compacting the soil either prior to or after the placement of the seed in the soil. The present disclosure provides a system that answers that need.

The present disclosure presents a blend of old concepts with inventive improvements. This blend provides a planter 100 comprising a row assembly 200 or 300 (see FIGS. 2,3) that provides means to precisely place seeds 20 relative to depth 82 and spacing 36 (see FIG. 8) while avoiding the compaction 6 problems caused by prior art use of disc openers 50. In short, the present disclosure presents a planting or row assembly 200, 300 (See FIGS. 2,3) that does not employ row openers and, instead, includes the use of seed dibblers 12 or 22 for precise seed 20 placement with less soil compaction and soil disturbance. The dibblers 12, 22 may be used in a broader array of soil conditions than previous coulter and planter compacted furrows, without added soil compaction, resulting in higher, more predictable yields. And, because the dibbler's 12, 22 operation displaces and moves less soil 80 than traditional row openers it can be used to plant during a broader array of soil 80 conditions with less or minimal impact on the soil 80 or seed 14. In some example embodiments, spacing 36 and timing relative to the seed dibblers 12, 22 which may be operated in vertical relationship as specialized reciprocating dibblers 12 See FIG. 2) or, alternatively, in horizontal elliptical operation (FIG. 3) where specialized dibblers 220 are translationally moved along an elliptical drive 56 (see FIG. 3) may be important. The sophistication of current planting devices relative to seed depth and precision planting regimes, along with real-time monitoring can be employed to operate and manage the present inventive row assemblies 200, 300.

Figure 2:
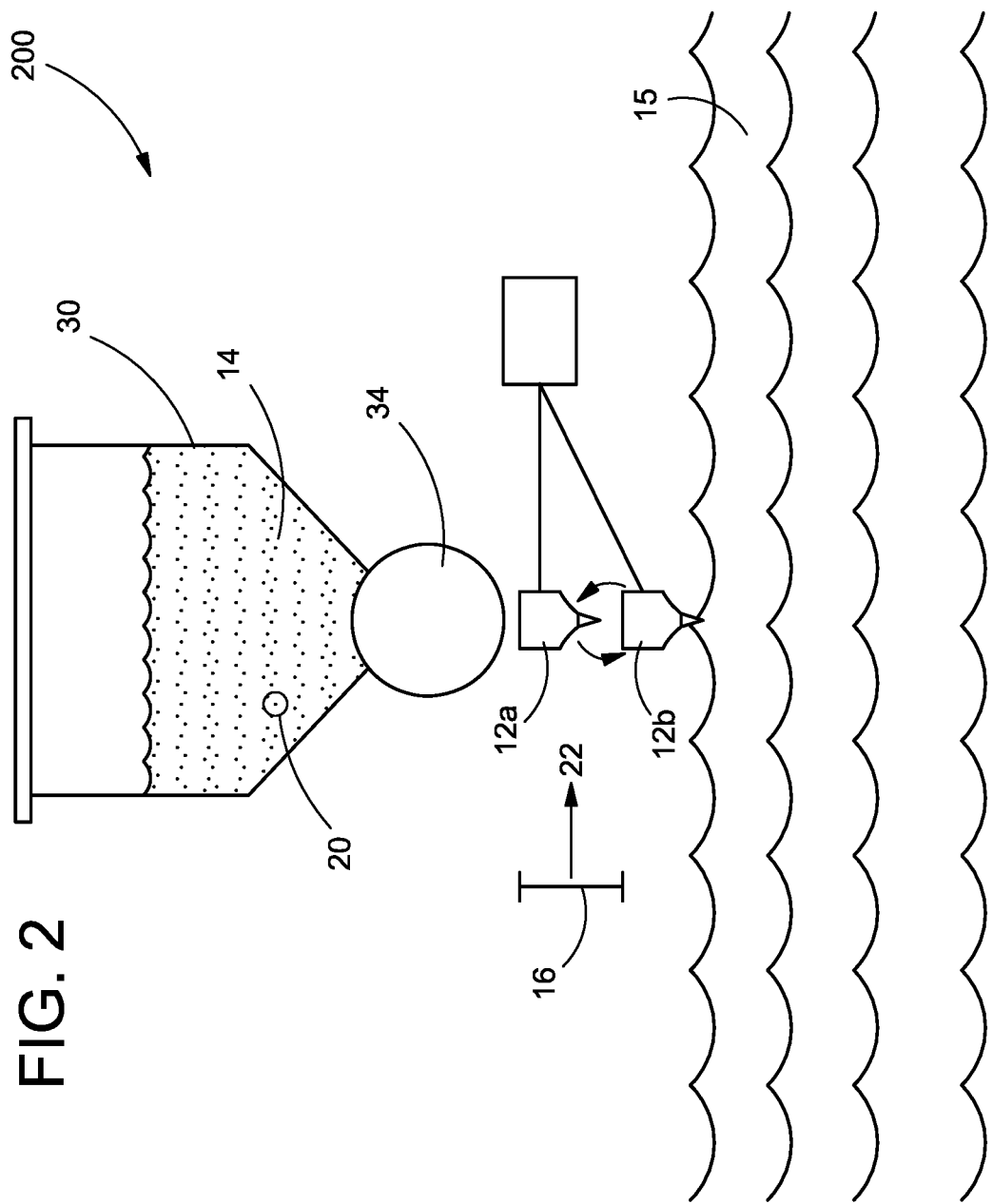
FIG. 2 is a diagram of a first version of an example seed dibbler.
Figure 3:
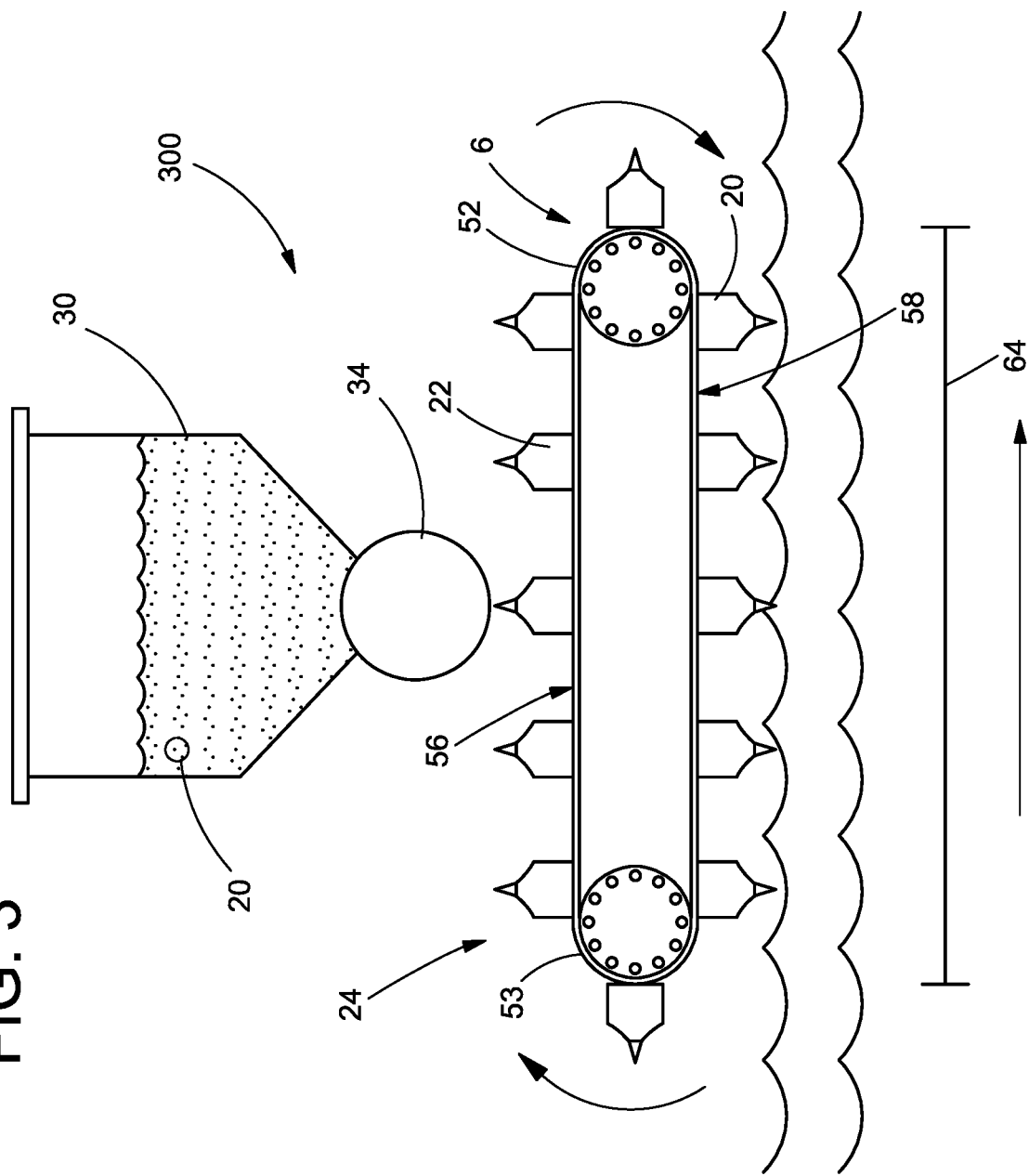
FIG. 3 is a diagram of a second version of an example seed dibbler.

The vertical embodiment or reciprocating dibblers 12*a* and 12*b* in FIG. 2 comprises a first dibbler 12*a* and second dibbler 12*b* in a reciprocal pair 16. The first dibbler 12*a* is moved upward toward a seed box 30 and an associated singulator 34 to receive a seed 20 while the second dibbler 12*b* is moved downward to deliver its seed 20 to the soil 80, at a depth 82 (see FIG. 8) pre-selected and set for the reciprocating dibblers 12*a*, 12*b*. Thereafter, the first dibbler 12*a* is moved downward to deliver its seed 20 to the soil 80, while the second dibbler 12*b* is moved upward toward the associated singulator 34 to receive a seed 20. This embodiment may include multiple reciprocating dibbler pairs 16 at least one said pair 16 associated with each seed box 30. At least one reciprocal pair 16,12*a*, 12*b* is set to plant seed 20 in a single row 4. In some embodiments multiple pairs 12*a*, 12*b* are timed to operate simultaneously to plant a single row 4; in others only a single reciprocating pair provides seed 20 for each row 4. As with conventional planters, the seed depth can be set and adjusted in any of several ways. Upon lowering a dibbler 12*a*, 12*b* to the desired depth for planting seed 14 via reciprocating movement (or elliptical drive to be described hereafter), the seed 14 is released in a manner to be described herein, and the dibbler 12*a*, 12*b* returned to receive another seed 14 from the singulator 34

Figure 6:
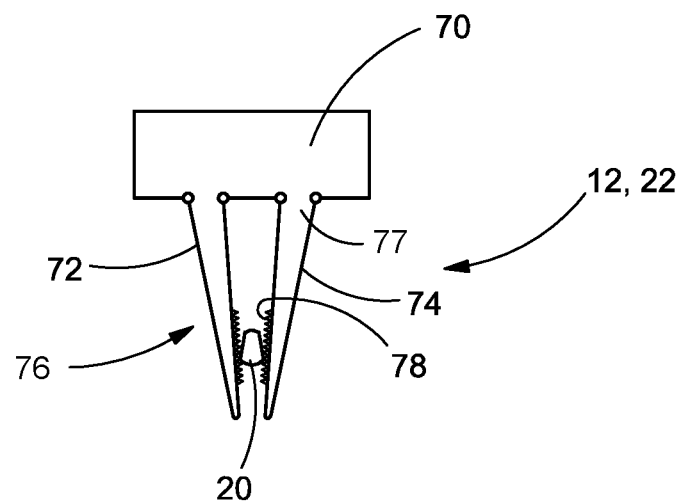
FIG. 6 is a diagram of an example seed dibbler in a closed position prior to insertion of seed in the soil.
Figure 7:
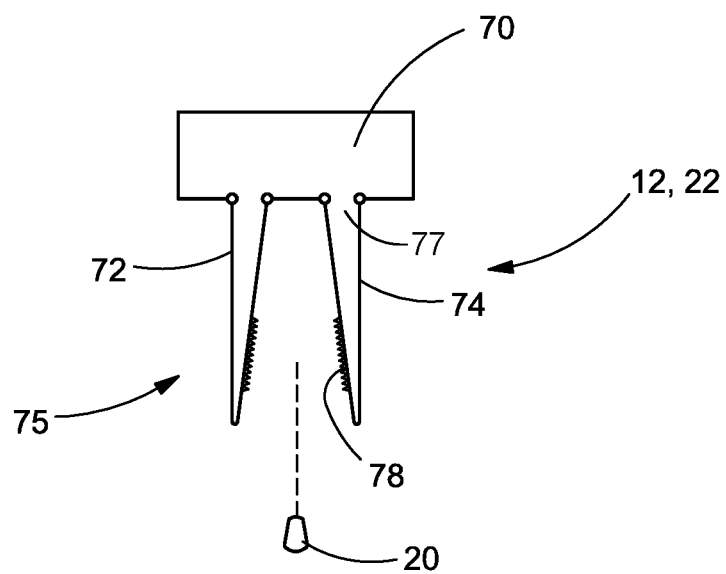
FIG. 7 is a diagram of an example seed dibbler in an open position after insertion of seed in the soil.

An alternate embodiment may operate in a horizontal manner. In this embodiment a horizontally-oriented elliptically-shaped drive path 56 and a belt 58 on that drive path is associated with a plurality of non-reciprocating dibblers 22. The belt 58 is associated by a driving wheel 52 or other driver capable of rotating the belt as described herein. A driven wheel 53 or other passive means of facilitating movement of the belt is included. The belt is moved by association of the driver 52 with a tractor engine or PTO or other means to rotate the driving wheel 52 relative to the movement of the planter 100 through a field. In an embodiment, as the planter 100 moves across a field, the belt 58 is driven by the driving wheel 52 around the elliptical path 56 and the first end 52 and the second end 53. While traveling a first portion of the elliptical drive's path 56, each dibbler 22 receives seed 14 from a seed singulator 34 associated with a seed box 30. Each dibbler 22 continues its movement along the elliptical path 56 around a leading portion of the elliptical path 56 (leading relative to the direction of travel) where the dibbler 22 is lowered into the soil 80 and remains stationary relative to the ground, but not stationary relative to the movement around the elliptical path 56. While the belt 58 continues its movement on the elliptical path 56 and the planter 100 moves forward through a distance equal to a length 64 of the lower portion of the elliptical path the dibbler 22 opens or is opened (in a manner described herein) to release the seed 20. When the planter 100 has moved a distance equal to the length of a lower portion 58a of the elliptical path the dibbler 22 is raised by its association with the belt 58 as it goes around the following portion of the elliptical path 56 thereby leaving the seed 20 in the soil 80. The dibbler 22 then travels the upper portion of the drive path 56 to receive another seed 20 from the seed box 30 and seed singulator 34. Seed placement is, in effect, accomplished by virtue of coordination of ground speed, drive speed, dimensions of the elliptical drive 56, and spacing of the plurality of dibbles 22 on the elliptical drive 56. These variables must be proportional such that a dibbler associated with the drive 56 is inserted in the soil to release the seed 20 and the ground speed of the planter and the forward speed of dibbler motion are related such that the dibbler does not have forward movement while the planter moves forward a distance equal to the lower portion of the elliptical drive path. Associating multiple dibbles as described herein with the drive path 56 provides means to seed a row 4. The dibbler is also preferably specially designed. One embodiment of a dibbler 12, 22 may include a connector section 70 and at least one, and preferably two or more, two pivotal legs 72, 74, each leg comprising a first end 77 associated with the connector section 70. The pivotal legs 72, 74 are moveable relative to each other and the connector section 70 from an open or release position 75 to a closed or secured position 76. The closed position 76 comprising means to grip 78 a seed 20 while the dibbler 22 is inserted into the soil and thereafter the legs 72, 74 moved to a release position 75 and the dibbler 22 raised, leaving the seed 20 at appropriate depth without the soil compaction problem of the prior art. Means to grip 78 the seed 20 may comprise a friction hold, e.g., ridges formed on or associated with an inner surface of one or both or all legs 72, 74, and/or a tension member to urge legs 72 and 74 toward one another as may be known in the art, or an indentation formed in an inner surface of one or both legs 72, 74 to provide security. In operation, the seed 14 is fed to the dibbler via a seed singulator while the dibbler is in a closed or secured position (FIG. 6) of the dibbler 22 and then inserted into the soil followed by the release position (FIG. 7) as the dibbler 22 is retracted from the soil, leaving the seed 20 perfectly placed at a prescribed depth 82.

In the reciprocating embodiment (FIG. 2) a first dibbler is moved up or down in reciprocation with a second dibbler, comprising a pair. As a dibbler is moved upward it is positioned to accept a seed from the seed singulator. In one embodiment the dibbler includes an opening through which the seed is accepted into the dibbler and secured between legs 72, 74 in the closed position (see FIG. 6). In the reciprocating embodiment, when the dibbler is lowered to a pre-set depth in the soil, the legs are triggered to open to release a seed and the dibbler is raised out of the soil, and the legs closed and ready to accept the next seed from the singulator. Rapid reciprocating movement of multiple pairs of dibblers (in one embodiment there are several pairs planting in each row; in another embodiment a single pair is employed).

In example embodiments the planter assemblies 200 and/or 300 may be associated with a computer which records the locations of the seeds inserted into the ground via the dibblers (22, 12a, 12b). This data may be recorded in a memory of the computer so a farmer may know exactly where the seeds have been planted. This data may be used with a system configured to maintain the farm field in a manner that promotes crop growth. For example, in one embodiment, the farmer may use the data to control weeds in the field. For example, in a first embodiment, a robot may be configured to destroy plants with either a herbicide and/or a mechanical device (for example, knives). In one nonlimiting example embodiment the robot may be equipped with a camera that recognizes a plant and a processor that utilizes artificial intelligence. The artificial intelligence may, for example, enable the robot to spot and identify a weed. In example embodiments, the robot may use the seed location data to verify the identified plant is not a cash crop prior to killing the weed. In another embodiment, the robot does not have AI related to plant identification but more generally recognizes a plant. In this latter embodiment, any plant in a field which does not correspond to a plant growing at a location where a seed was planted may be destroyed by the robot. Thus, in this latter embodiment a determination of a type of plant (weed or cash crop) is not needed which reduces the complexity of the robot. Regardless, in either embodiment, a reduction or elimination of herbicide use is anticipated.

In addition to weed control, the data stored may be used by the system to apply fertilizer. For example, in one nonlimiting example embodiment, fertilizer may be provided in gel caps that may be inserted in the ground near a plant. In this embodiment, rather than applying fertilizer to an entire field (which is traditionally done), a robot may be configured to travel along the rows of plants and insert gel caps of fertilizer into the ground near locations where the seeds have been planted. The robot may, for example, include a dibbler similar to the previously described dibbler to insert the capsules into the ground near the cash crop plants. In addition, insertion of the capsules may be done on a periodic basis, for example, one month, two months, or three month intervals. This method of fertilizing a field may reduce the total amount of fertilizer necessary to fertilize a crop and reduce the risk of excessive runoff due to flooding.

Figure 10:
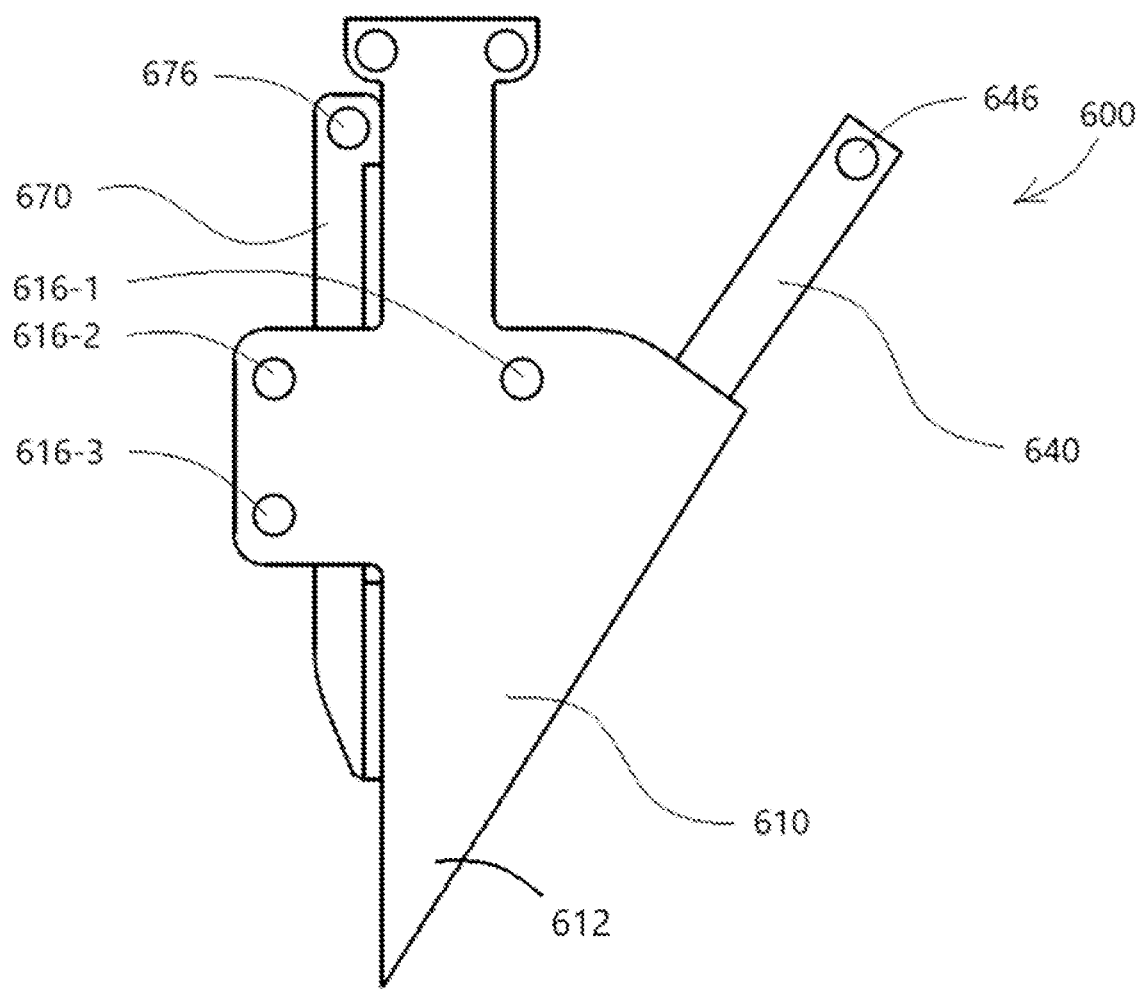
FIG. 10 is a side view of another example dibbler.
Figure 11:
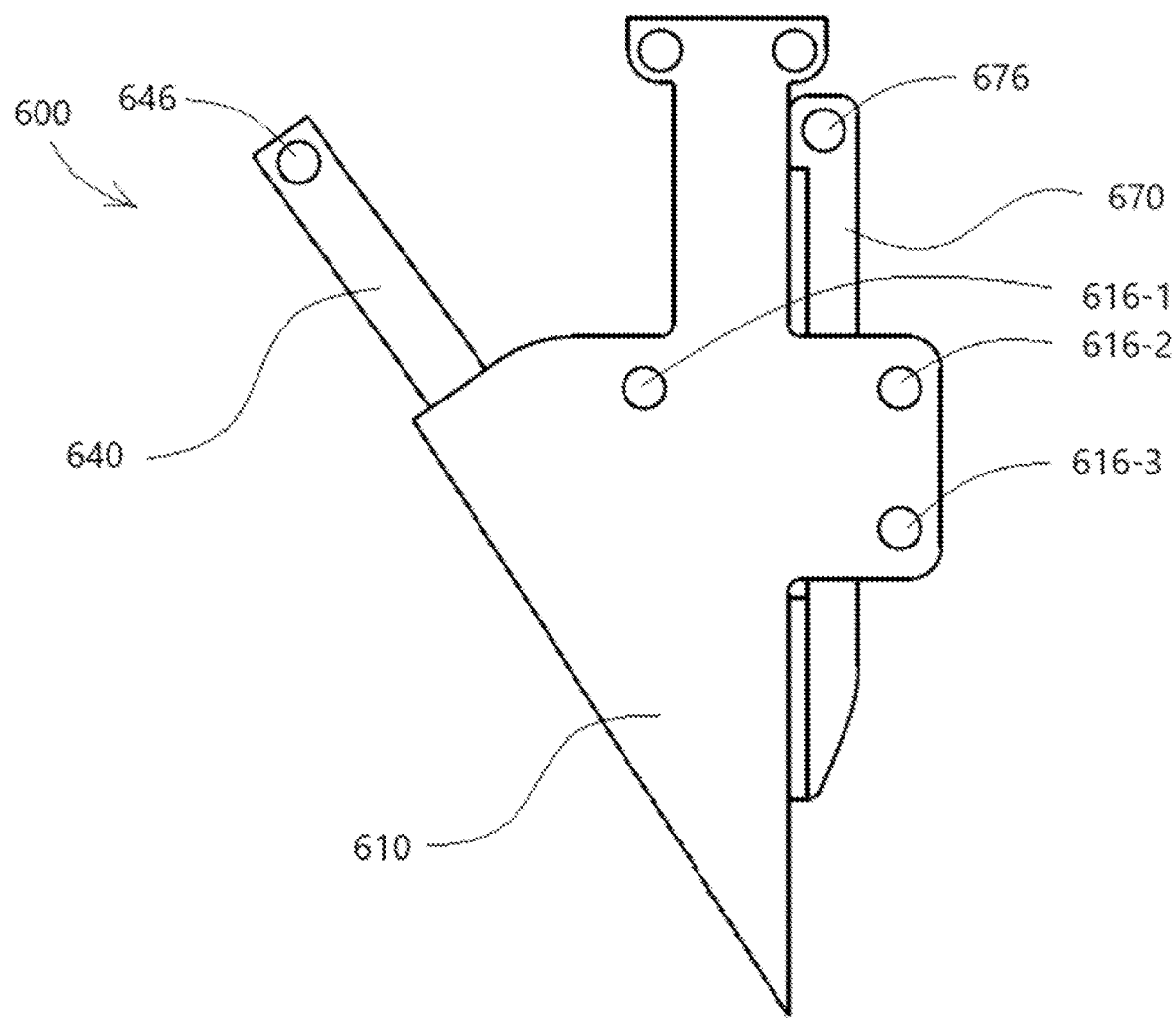
FIG. 11 is another side view of example dibbler.
Figure 12:
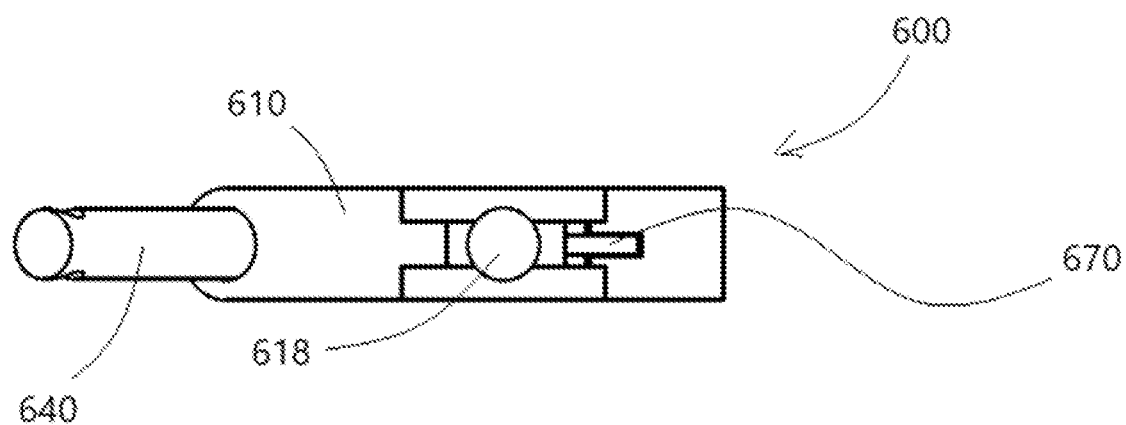
FIG. 12 is a top view of the example dibbler.
Figure 13:
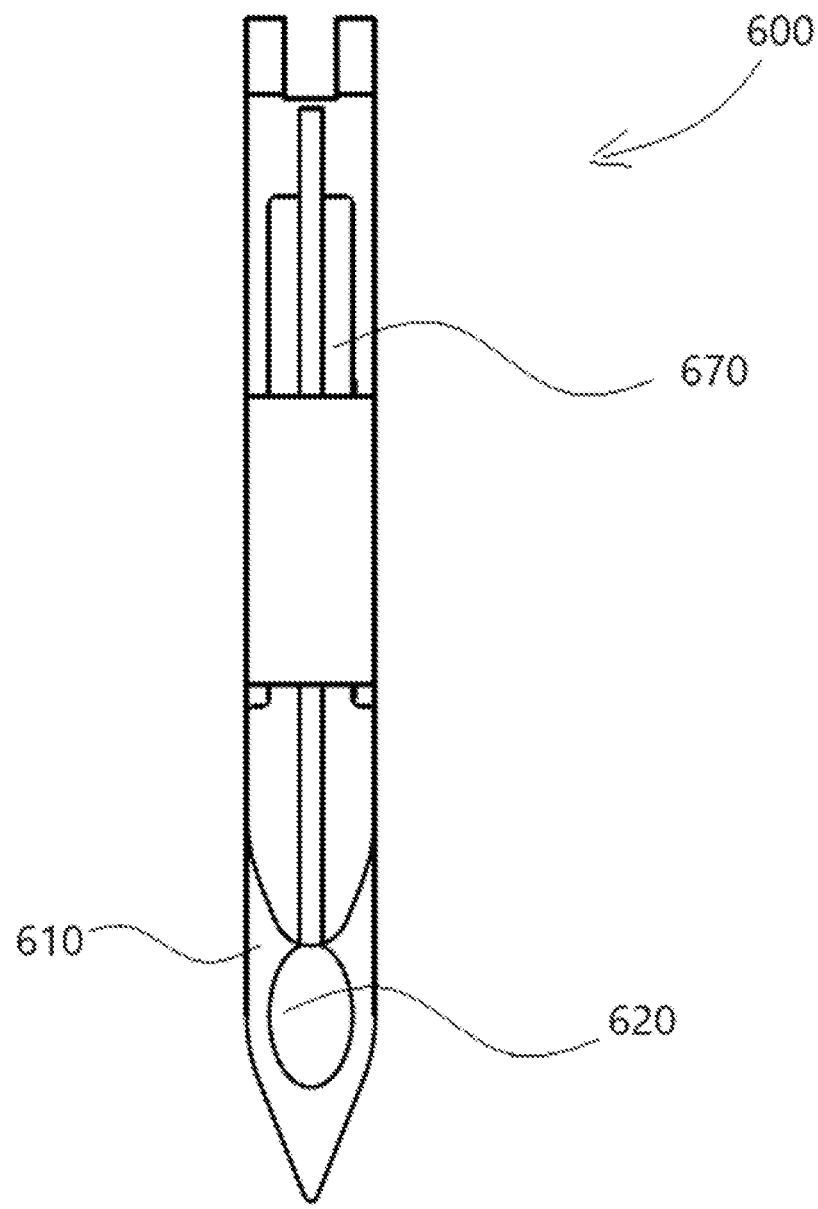
FIG. 13 is a front view of the example dibbler.
Figure 14:
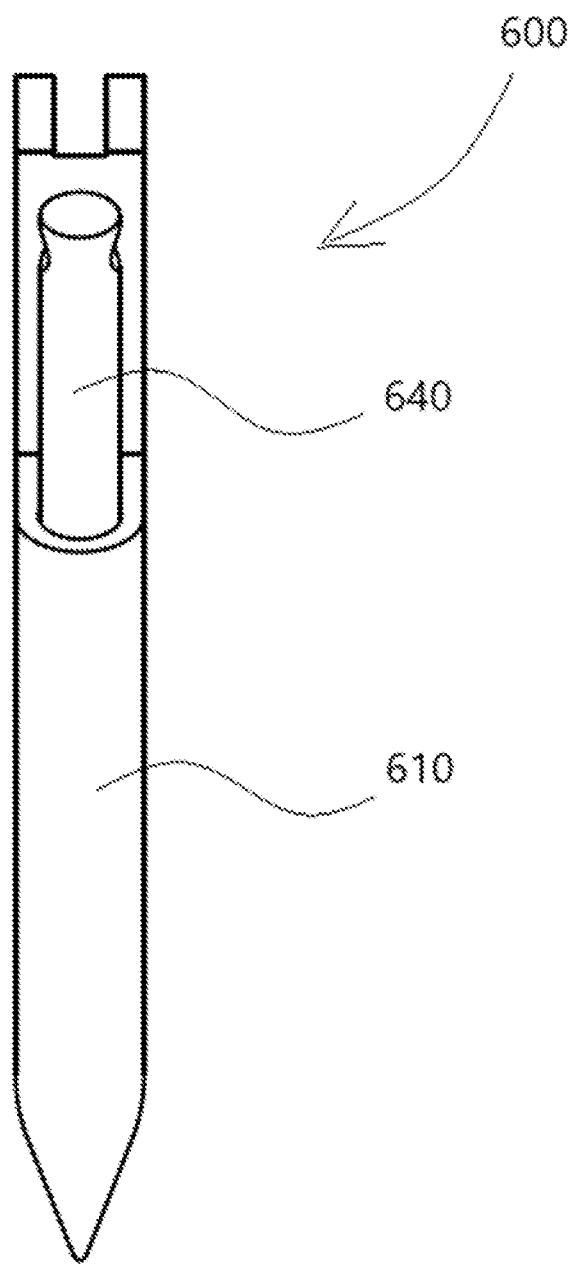
FIG. 14 is a back view of the example dibbler.
Figure 15:
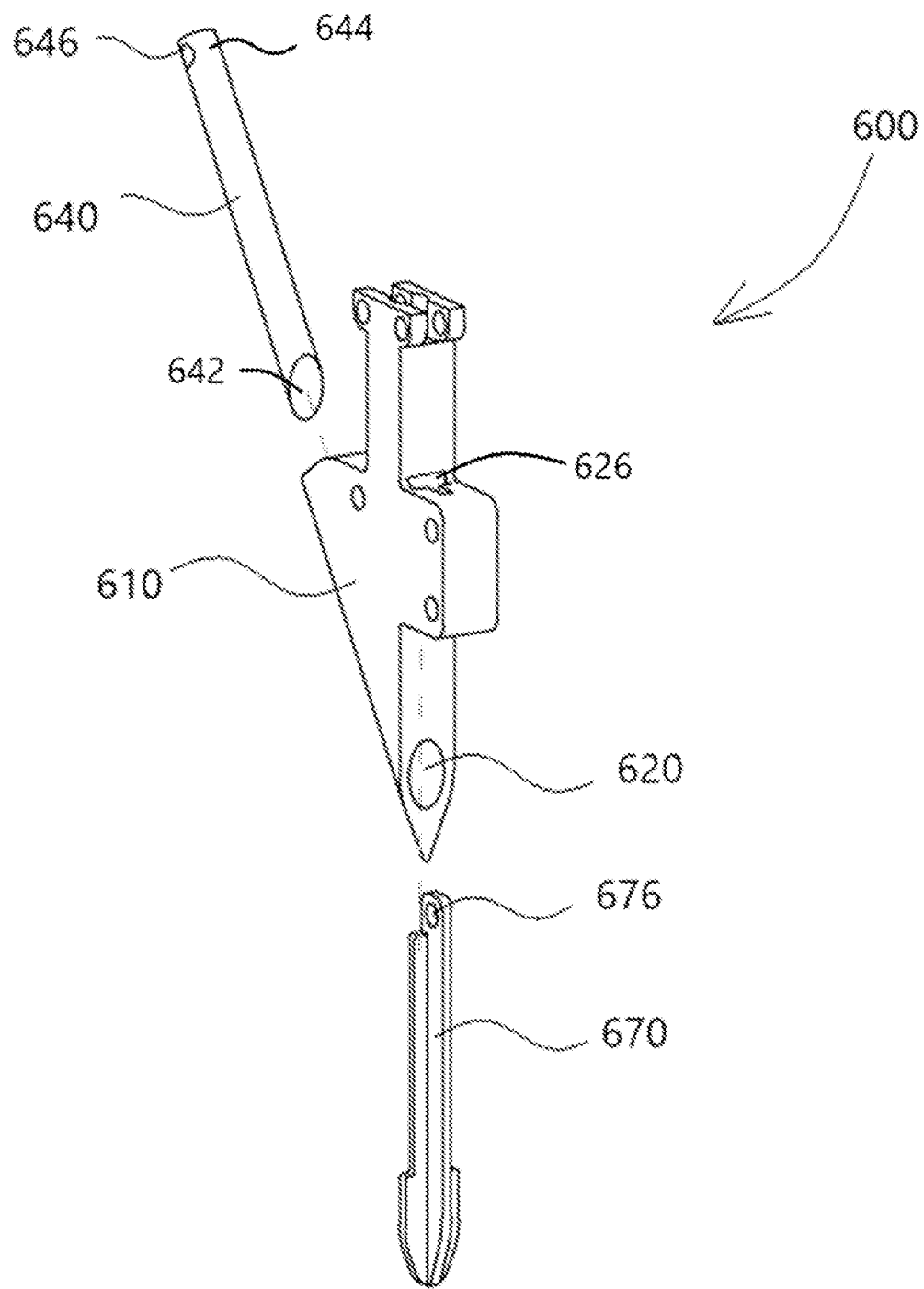
FIG. 15 is an exploded view of the example dibbler.
Figure 16:
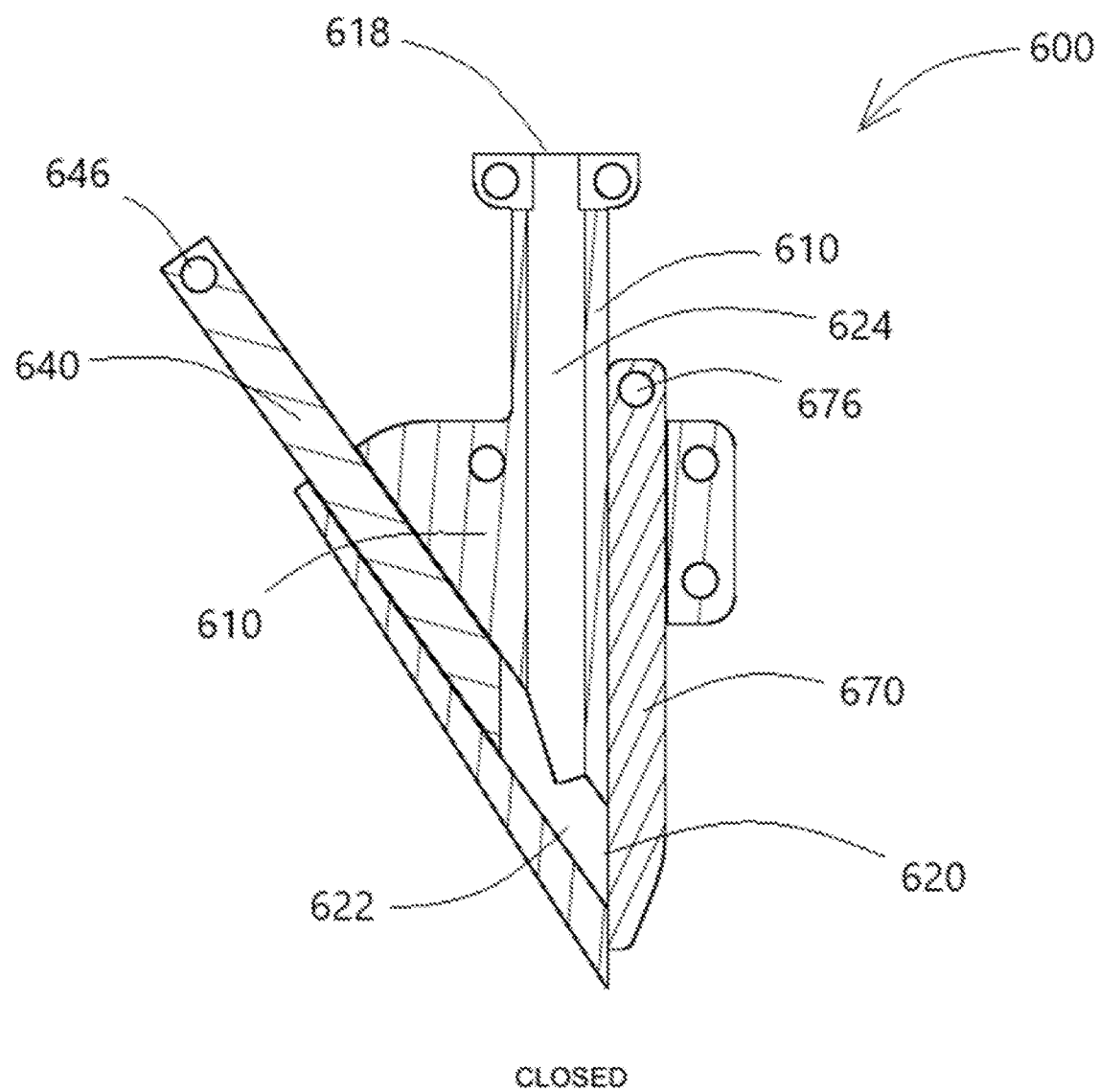
FIG. 16 is a section view of the example dibbler.
Figure 17:
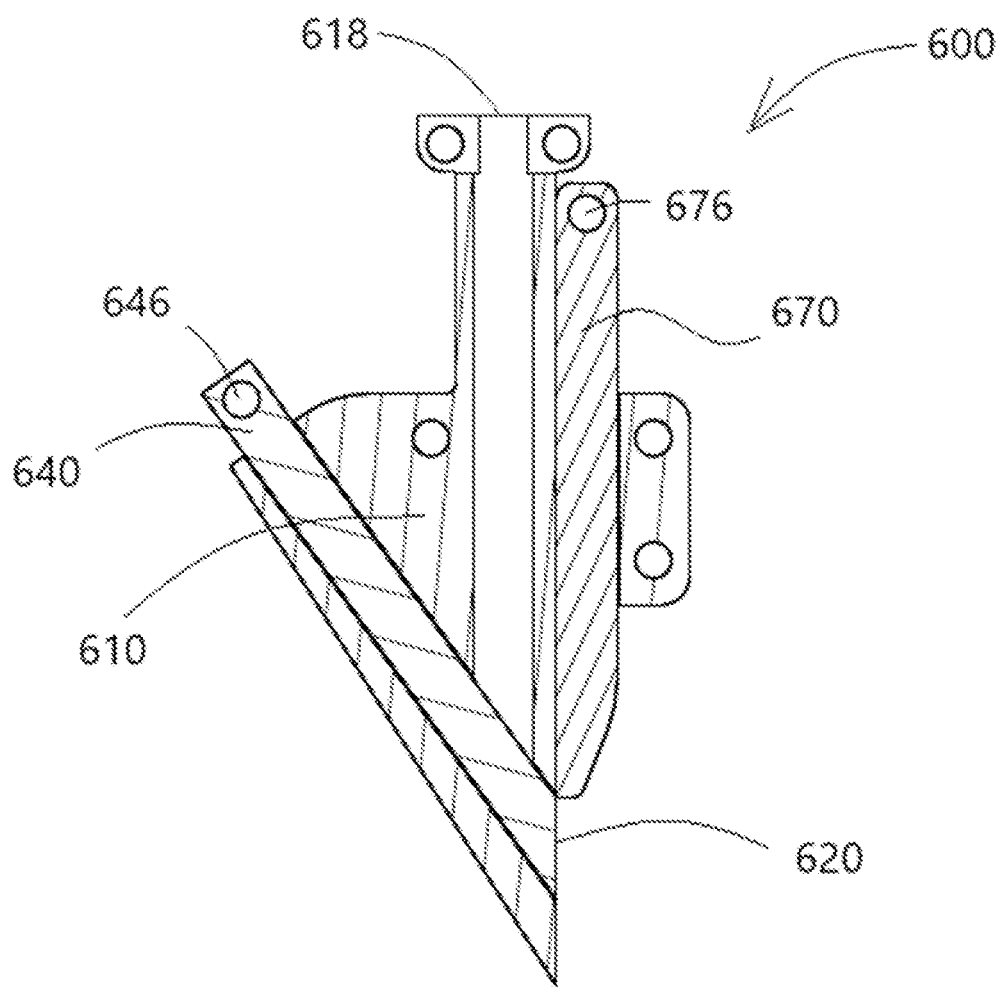
FIG. 17 is another section view of the example dibbler.
Figure 18:
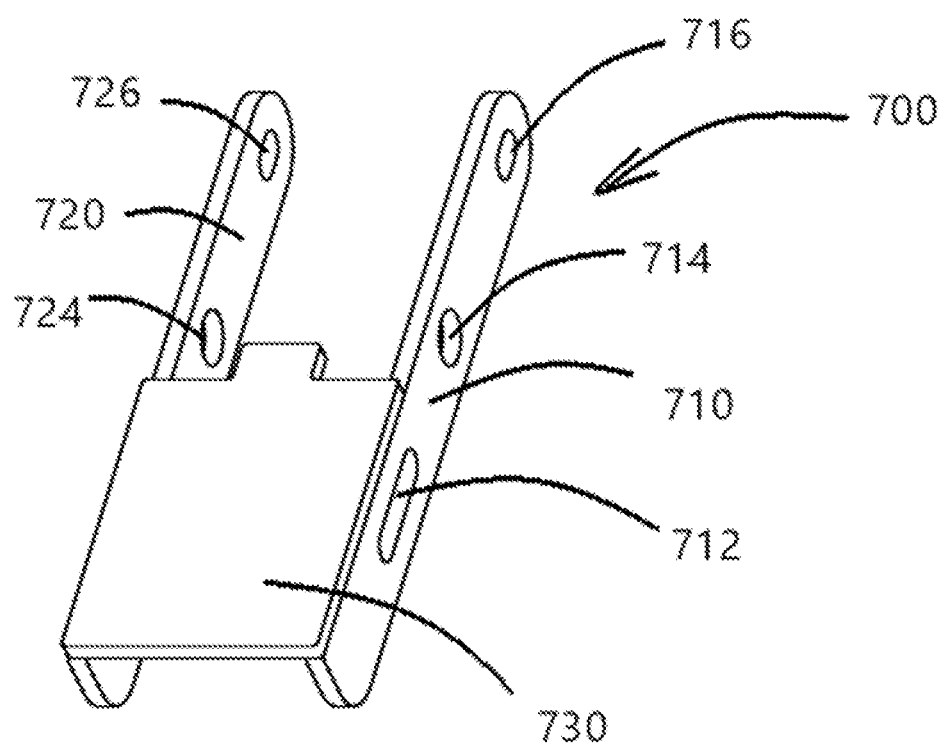
FIG. 18 is a perspective view of a pivot arm.
Figure 19:
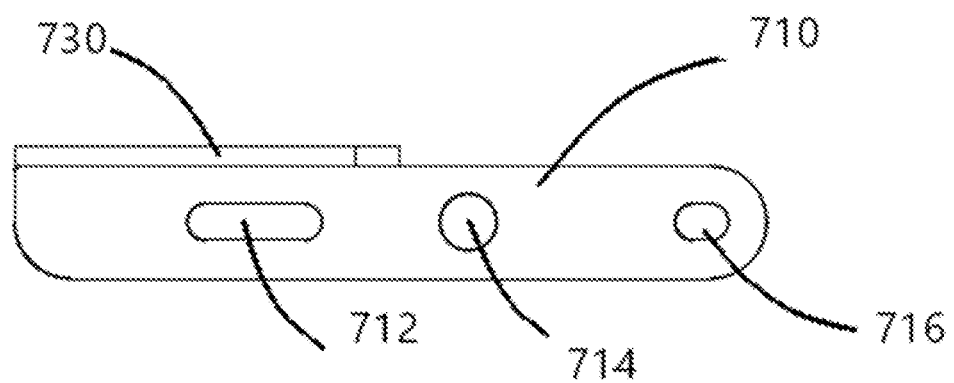
FIG. 19 is a side view of the example pivot arm.
Figure 20:
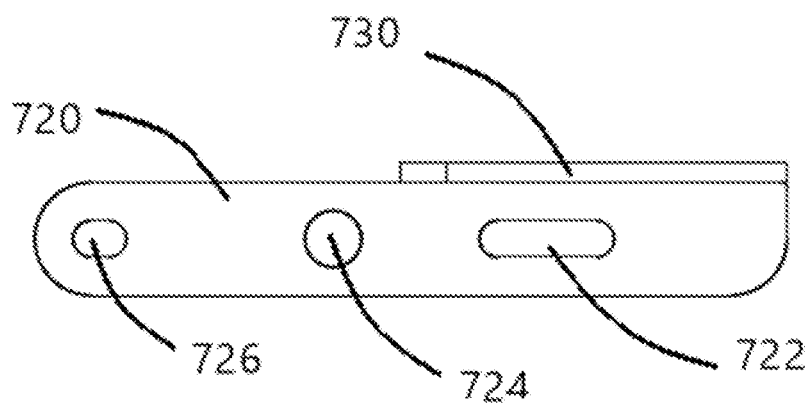
FIG. 20 is another side view of the example pivot arm.

The above disclosure is not intended to limit the invention. For example, FIG. 10 is another example of a dibbler 600 in accordance with an example of the invention. FIG. 10 is a first side view of the dibbler 600, FIG. 11 is a second side view of the dibbler 600, FIG. 12 is a top view of the dibbler 600, FIG. 13 is a front view of the dibbler 600, FIG. 14 is a back view of the dibbler 600, FIG. 15 is an exploded view of the dibbler 600, and FIGS. 16 and 17 are cross-section views of the dibbler 600. As shown in FIGS. 10-17, the dibbler 600 includes a body 610, a push pin 640, and a gate 670. The body 610 may be a substantially integral member having a seed entrance aperture 618 (see FIG. 12) allowing a seed to enter the body 610 and a seed exit aperture 620 (see FIG. 13) allowing the seed to exit the body 610. Between the seed entrance aperture 618 and the seed exit aperture 620 is a first channel 624 (see FIG. 16) configured to allow a seed to travel from the seed entrance aperture 618 to the seed exit aperture 620. In operation, a soil entrance region 612 of the body 610 is pushed into the ground. As shown in FIG. 1, the soil entrance region 612 generally tapers to a relatively narrow cross-section and may terminate in a point as shown in FIG. 10.

In the nonlimiting example embodiment of FIGS. 10-17 the push pin 640 and the gate 670 may be movable relative to the body 610. For example, the body 610 of dibbler 600 may have a second channel 622 (see FIG. 16) allowing the push pin 640 to move through the body 610. The body 610 may also include a third channel 626 (see FIG. 15) allowing the gate 670 to move through a portion of the body 610 to cover and/or expose the seed exit aperture 620. In use, a seed enters the body 610 via the seed entrance aperture 618 and falls through the first channel 624 to the seed exit aperture 620. The seed, however, may be blocked from exiting the body 610 in the event the gate 670 is lowered and covering the seed exit aperture 620. However, if the gate is moved up to expose the seed exit aperture 620, the seed may leave the body 610 and exit the dibbler 600 through the seed exit aperture 620.

As one skilled in the art would immediately recognize, soil, under some conditions, could block the seed exit aperture 620 during use as some soil may stick to, or fill a space in the dibbler 600, near the soil exit aperture 620. However, in the example of FIGS. 10-17, the push pin 640 may be pushed through the body 610 via the second channel 622 allowing an end 642 of the push rod 640 to push the seed and any soil that might be near the seed exit aperture 620 of the dibbler 600 out of the seed exit aperture 620. Thus, the problem with soil blocking the seed exit aperture 620 is eliminated. That said, it is understood the dibbler 600 might be used by some artisans in soil where blockage is not an issue. In these cases, the dibbler 600 may be modified such that the push pin 640 and second channel 622 are not incorporated in the dibbler design.

As shown in at least FIGS. 10-17, the push pin 640 may resemble a rod having a first end 642 and a second end 644. The push pin 640, in one embodiment, may resemble a cylinder however this is not intended to limit the invention, since the rod may have a different cross-section, for example, an elliptical or polygonal shape such as a triangular, square, hexagonal, or octagonal shape. The cross-sectional shape of the second channel 622 may correspond to the cross-sectional shape of the push pin 640, albeit slightly larger, to allow the push pin 640 to pass through the body 610 to assist in ejecting a seed from the body 610 while preventing buildup of contaminants in the body 610.

Figure 21:
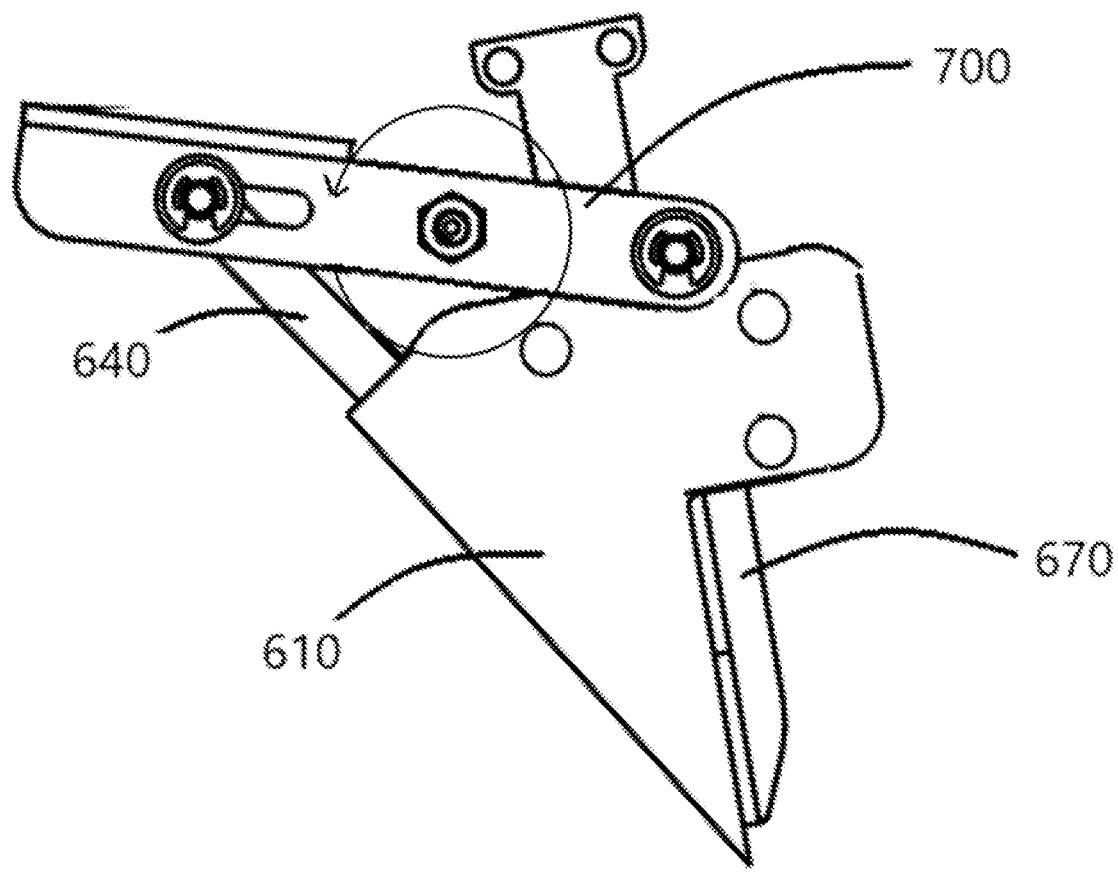
FIG. 21 is a view of the pivot arm engaged with an example dibbler.
Figure 22:
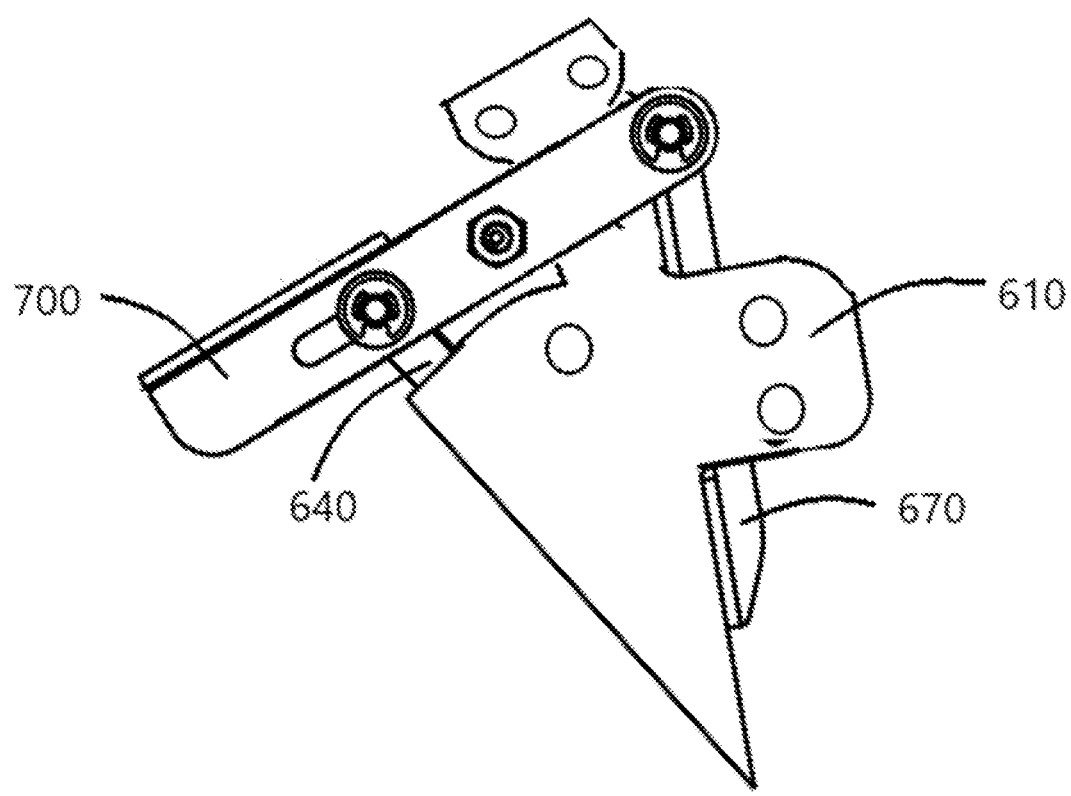
FIG. 22 is another view of the pivot arm engaged with an example dibbler.

In example embodiments a movement of the push pin 640 and the gate 670 may be synchronized through the use of a pivot arm 700, as shown in at least FIGS. 18-22. In the nonlimiting example of FIGS. 17-22, the pivot arm 700 is comprised of a receiving plate 730 and two bars 710 and 720. The first bar 710 may include three apertures 712, 714, and 716. The first aperture 712 is a slotted aperture whereas the second aperture 714 is a substantially circular aperture. The third aperture 716 may also be slotted. The second bar 720 includes similar apertures 722, 724, and 726 having similar geometries. In example embodiments the gate 670 may include a circular aperture 676 which may be aligned with apertures 716 and 726 of the pivot arm 700. The push pin 646 may include a circular aperture 646 near a second end 644 thereof which may be aligned with the slotted apertures 712 and 722 of the pivot arm 700. Pins may be used to pivotally connect the gate 670 and the push pin 640 to the pivot arm 700. For example, a pin may pass through apertures 716, 676, and 726 to pivotally connect the gate 670 to the pivot arm 700. A second pin may pass through apertures 712, 646, and 722 to connect the push pin 640 to the pivot arm 700. Examples of these pins are shown in at least FIGS. 21 and 22. As shown in FIGS. 21 and 22, when the pivot arm 700 is rotated as shown by the arrow, the gate 670 is moved to expose the seed exit aperture 620 while the push pin 640 is pushed through the body 610 via the second channel 622 to assist in ejecting the seed through the seed exit aperture 620 (when needed) and/or clear any contaminants which may be in the body 610. When rotated the opposite direction the gate 670 is moved downwards to cover the seed exit aperture 620 while the push pin 640 is moved outwards from the body 610.

It is noted the dibbler 600 described in FIGS. 10-22 may be used in any of the previously described embodiments but is especially useful in the example embodiments to follow.

Figure 23:
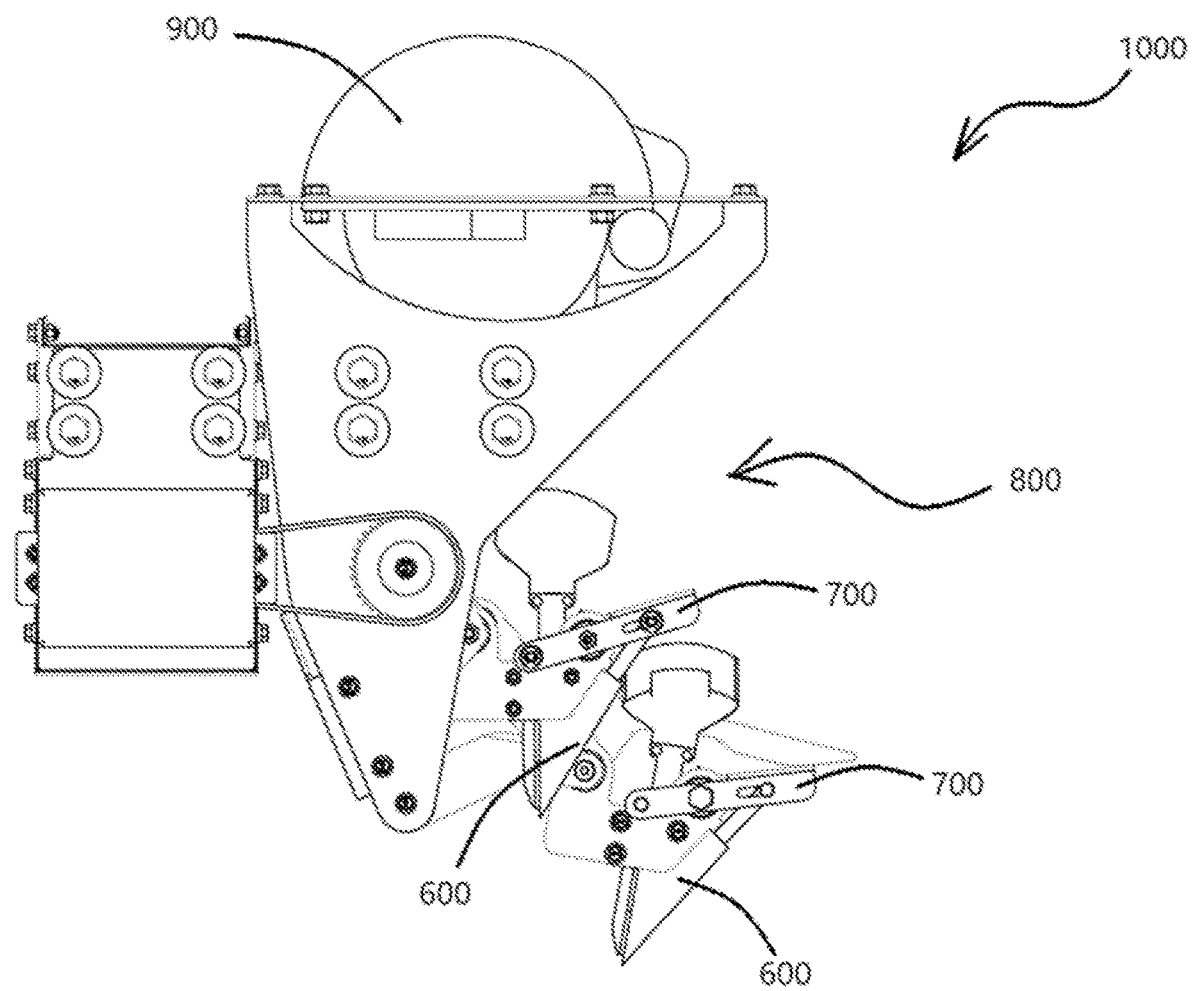
FIG. 23 is a view of an example planter unit.
Figure 24:
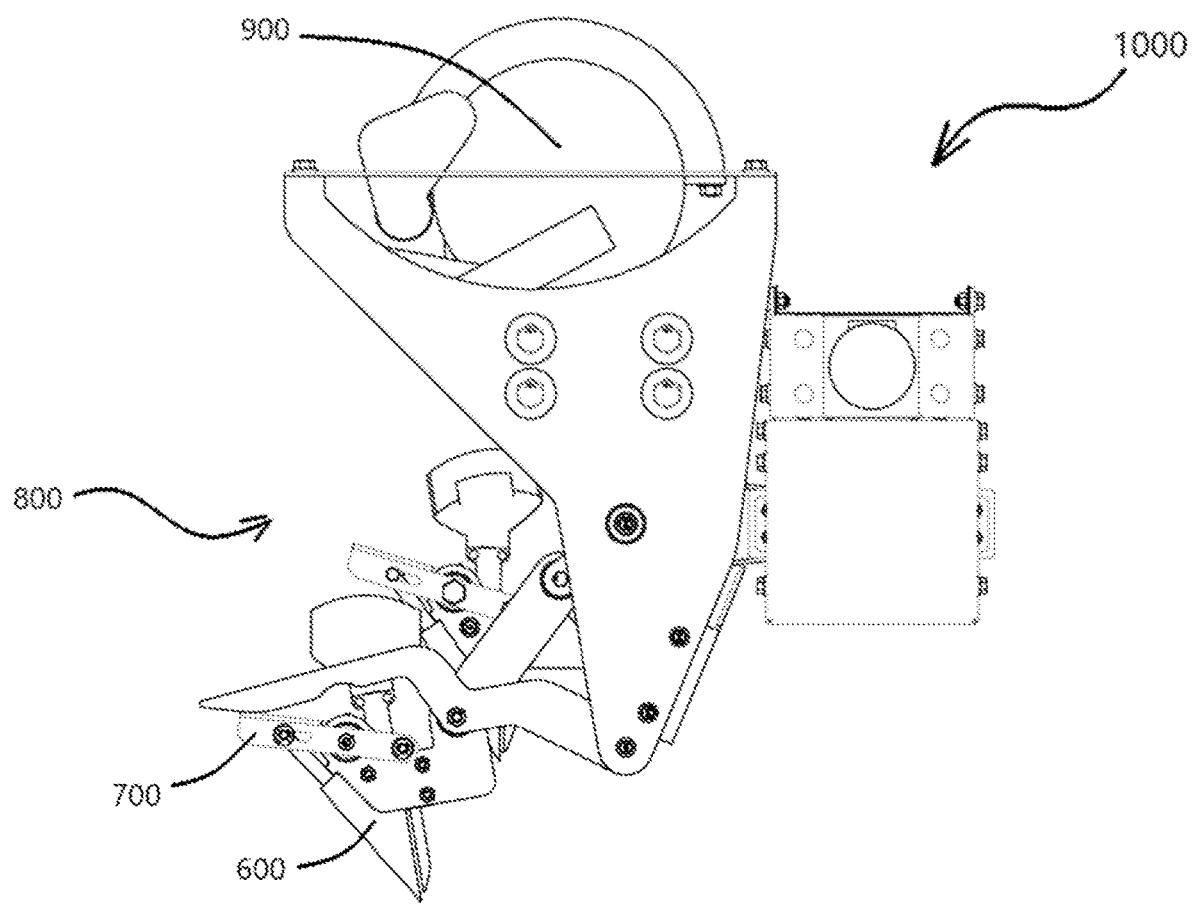
FIG. 24 is another view of the example planter unit.

FIG. 23 is a view of a planter unit 1000 which may be attached to parallel linkages of a standard row unit. As shown in FIG. 23, the planter unit 1000 may include a pair of dibblers 600 offset from one another, a pair of pivot arms 700, a dibbler actuating mechanism 800 which may move the dibblers 600, and a seed meter 900 to dispense seed. An exploded view of the planter unit 1000 is provided as FIG. 25. At a high level, the dibbler actuating mechanism 800 includes a frame comprising a first side panel 802, and second side panel 804 and a back panel 806 that may be attached together by a conventional means, for example, welding, bolts, nuts, rivets, screws, plates, and/or an adhesive. In example embodiments, a motor, for example, an electric motor, may drive an energy transfer member 882 which may actuate a sprocket 884 which may drive many of the elements of the dibbler actuating mechanism 800. The energy transfer member 882 may take on the form of one or more gears, for example, a gear train, a chain, a belt, or a combination therefore. Regardless, the motor may cause the sprocket 884 to rotate which causes a drive link 886 to rotate. The drive link 886 may impart rotational energy into the dibbler actuating mechanism 800 as will be described below.

Figure 25:
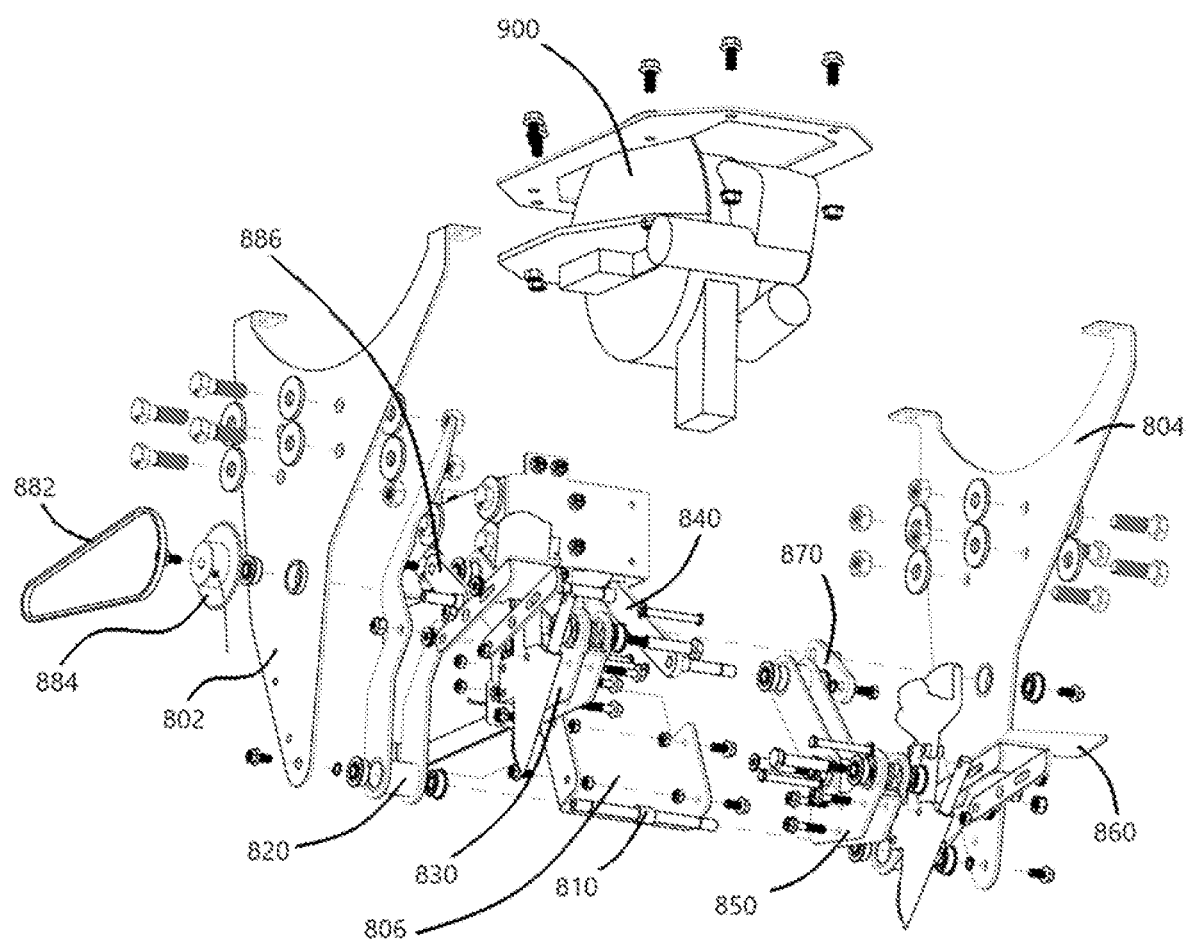
FIG. 25 is an exploded view of the example planter unit.

Referring to FIG. 25, the dibbler actuating mechanism 800 may include a first linkage 820, a second linkage 830, a third linkage 850, and a fourth linkage 860. The first and fourth linkages 820 and 860 may be substantially the same (though they may be mirror images of one another), thus, only the first linkage 820 will be described in detail. Similarly, the second and third linkages 820 and 850 may be substantially the same, thus, only the second linkage 820 will be described in detail.

Figure 26:
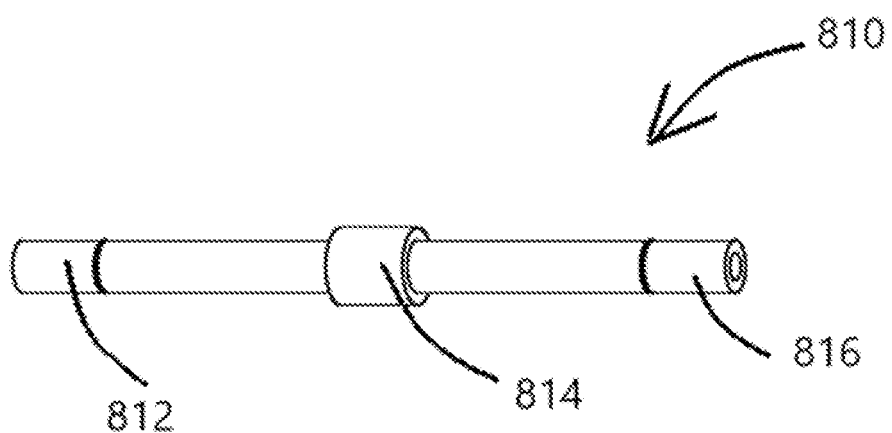
FIG. 26 is a view of a restraining rod.
Figure 27:
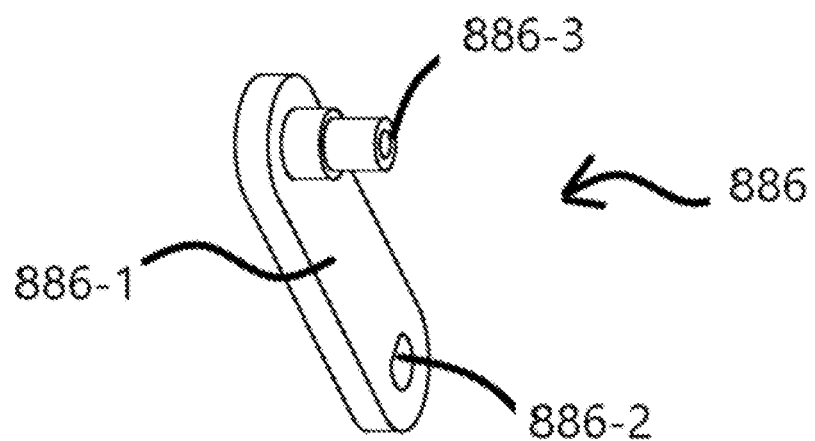
FIG. 27 is a view of drive link.

Referring to FIGS. 25 and 26 it is observed the dibbler actuating mechanism 800 includes a restraining rod 810 which extends from a first end 812 to a second end 816. The ends 812 and 816 may have internal threads allowing the ends 812 and 816 to be secured to the first and second panels 802 and 804 by a pair of screws. The restraining rod 810 serves as pivot point for the first linkage 830 (and the fourth linkage 860). For example, referring to FIG. 28, the first linkage 823 is illustrated as having a first arm 821 and a second arm 822 connected to a cylindrical base 823. In example embodiments, the restraining rod 810 may penetrate the cylindrical base 823 such that the first linkage 823 can only pivot about the restraining rod 810. It is understood that other components, for example, bushings or bearings may be provided between the cylindrical base 823 and the restraining rod 810 to promote a proper rotation of the first linkage 820 about the restraining rod 810 (the same may be said for the connection between 863 of the fourth linkage 860 and the restraining rod 810).

Figure 28:
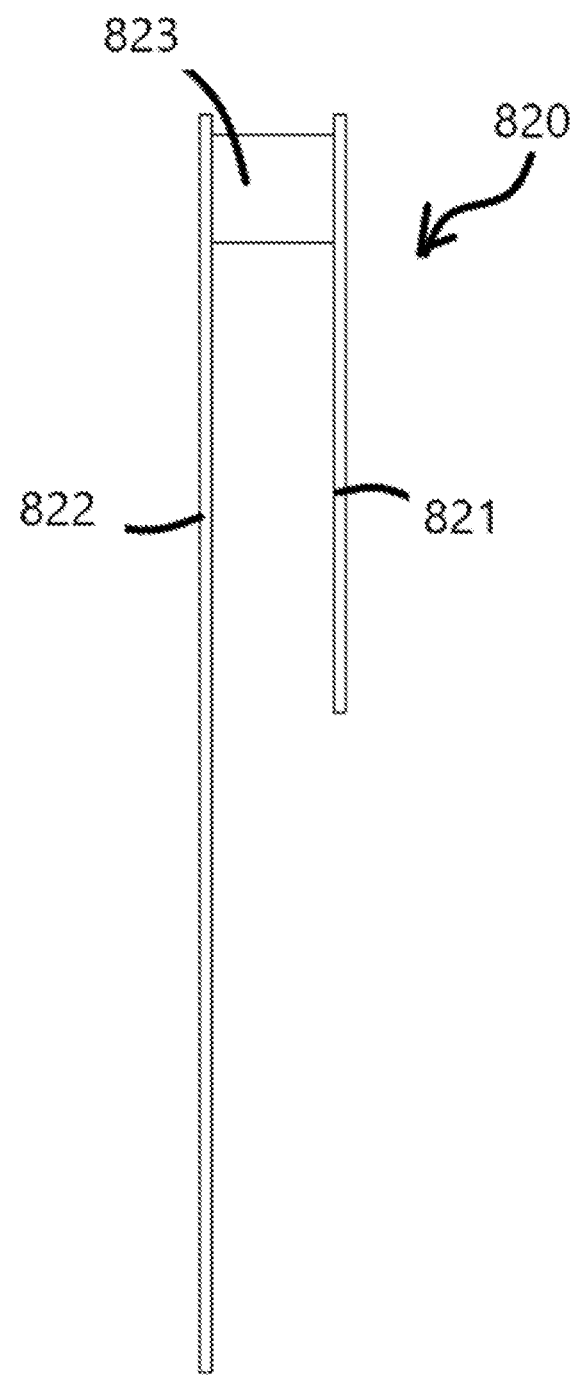
FIG. 28 is a view of a first linkage.
Figure 29:
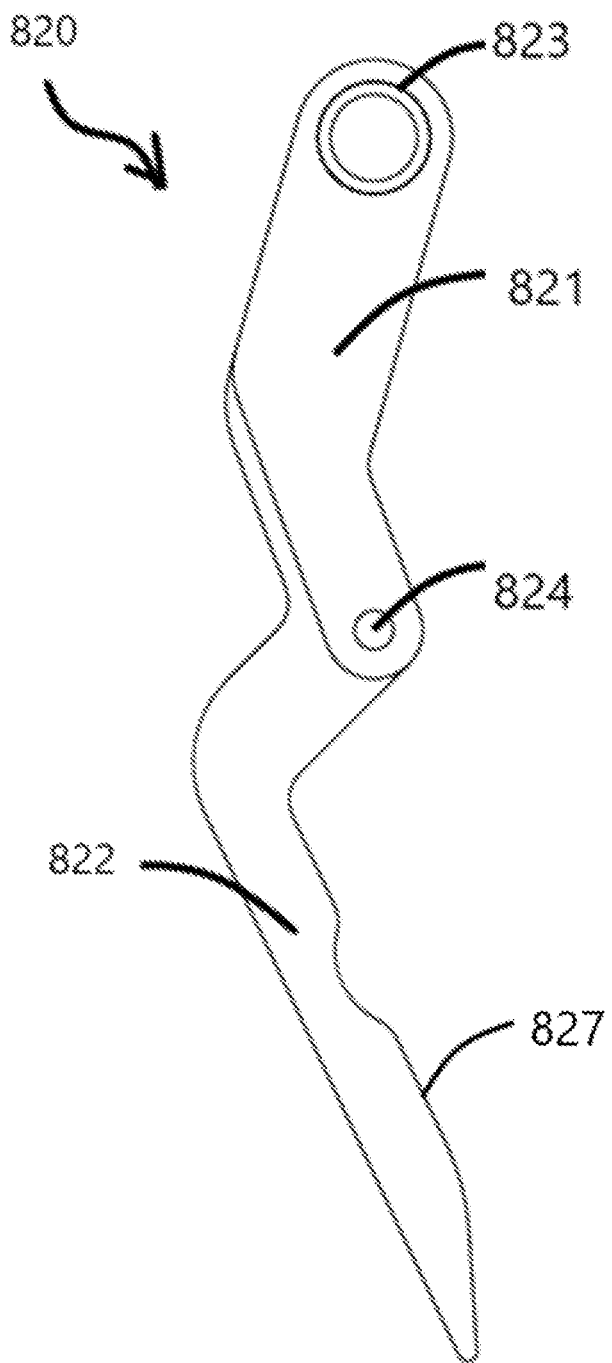
FIG. 29 is side view of the first linkage.
Figure 30:
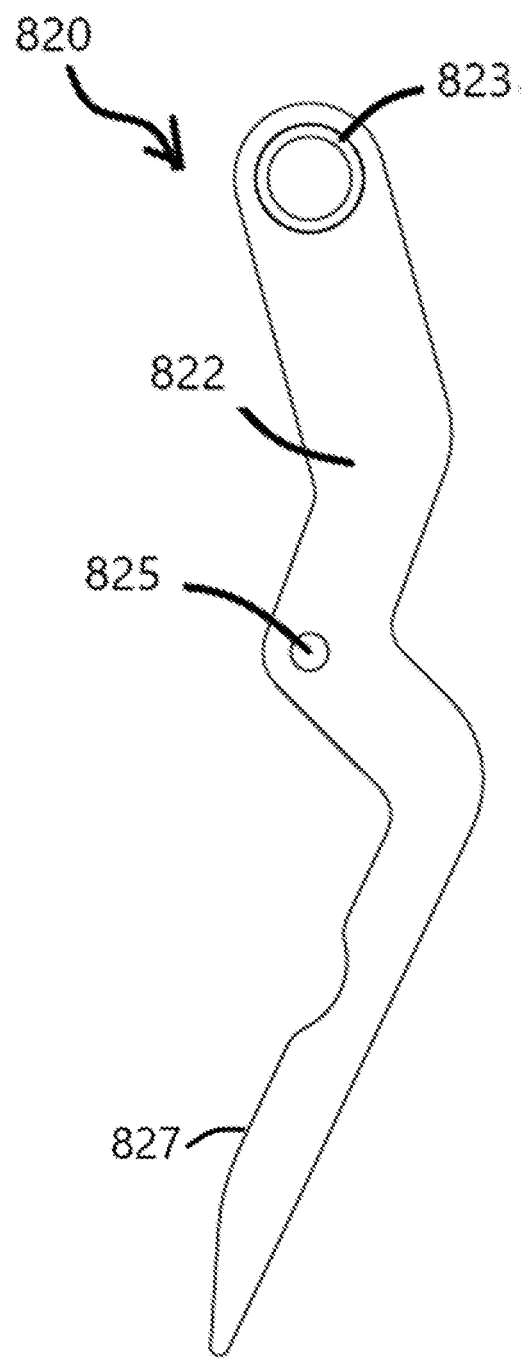
FIG. 30 is another side view of the first linkage.

Referring to FIGS. 28-30 it is observed the first linkage 820 includes the first arm, the second arm 822 and the base 823. In example embodiments, each of the first and second arms 820 and 822 may include an aperture allowing the second linkage 830 to pivotally connect thereto. For example, the first arm 821 may include an aperture 824 and the second arm 822 may include an aperture 825 which may be substantially aligned with the aperture 824 to allow a pin passing through aperture 824 to also pass through aperture 825 to promote a pin type connection. Additionally, as one skilled in the art would readily recognize, the second arm 822 is considerably longer than the first arm 821. As will be explained shortly, the additional length allows a surface 827 of the second arm 822 to contact a receiving plate 730 of one of the pivot arms 700 to cause the pivot arm 700 to pivot to release a seed from its associated dibbler 600.

Figure 31:
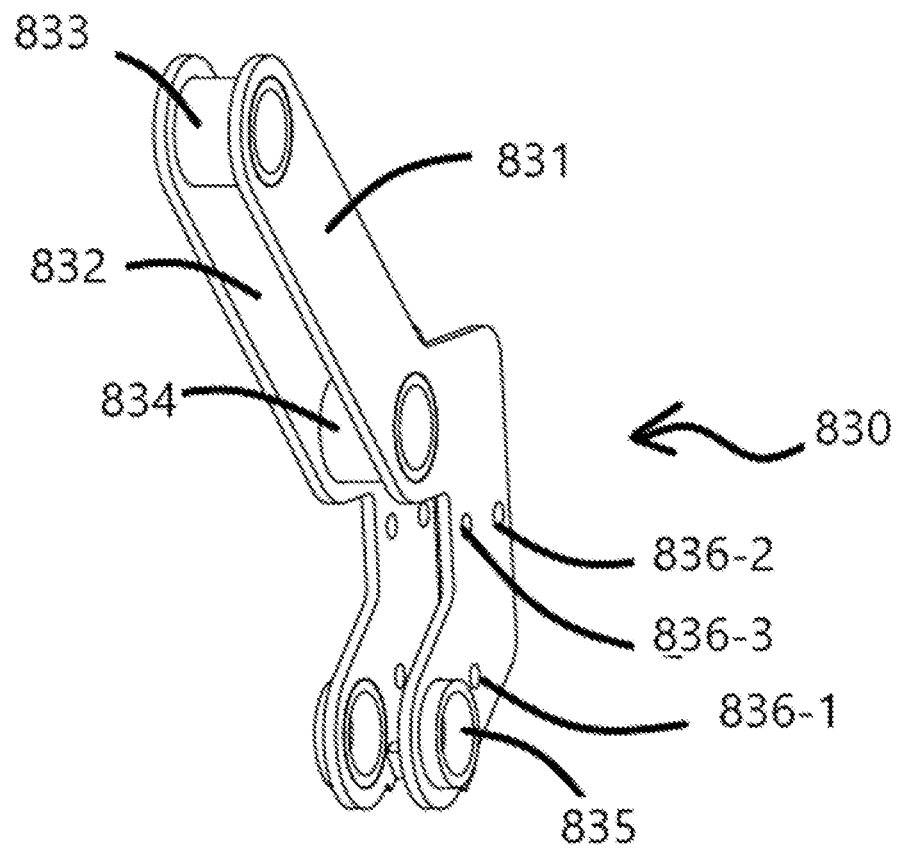
FIG. 31 is a perspective view of a second linkage.

Arranged between the first and second arms 821 and 822 of the first linkage 820 is the second linkage 830. The second linkage 830 is comprised of two arms 831 and 832 configured to support a dibbler 600, a support a pivot arm 700, and pivotally connect to the first linkage 820. For example, FIG. 31 illustrates the first arm 831 as having a plurality of holes 836-1, 836-2, and 836-3 which are alignable with holes 616-1, 616-2, and 616-3 of holes in body 610 of the dibbler 600. Though not labeled, the second arm 832 has a similar arrangement of holes. This arrangement allows a dibbler 600 to be connected to the first and second arms 831 and 832 using pins, screws, bolts, and the like. A pivot arm 700 may be attached to the second linkage 830 via a pin type connection using apertures 835 in the first arm and second arm 831 and 832. For example, apertures 714 and 724 of the pivot arm 700 may be aligned with the apertures 835 of the first and second arms 831 and 832 and a pin may be inserted into the apertures 714,724, and 835 to connect the pivot arm 700 to the second linkage 820 allowing for a pivotal connection. Similarly, the first linkage 830 may include a hollow sleeve 834 connecting the first and second arms 831 and 832 together. The sleeve 834 may be alignable with holes 824 and 825 of the first linkage 820 and pin may pass through each of the sleeve 834 and the holes 824 and 825 to facilitate a pin type connection between the first linkage 820 and the second linkage 830.

In example embodiments, the drive link 886 may be driven by the sprocket 881. The drive link 886, as shown in at least FIG. 25, may include an aperture which may be aligned with a second hollow sleeve 833 of the second linkage 830. Like the other connections, a pin may be passed through the aperture of the drive link 886 and into the second cylinder 833 of the second linkage 830.

Figure 32:
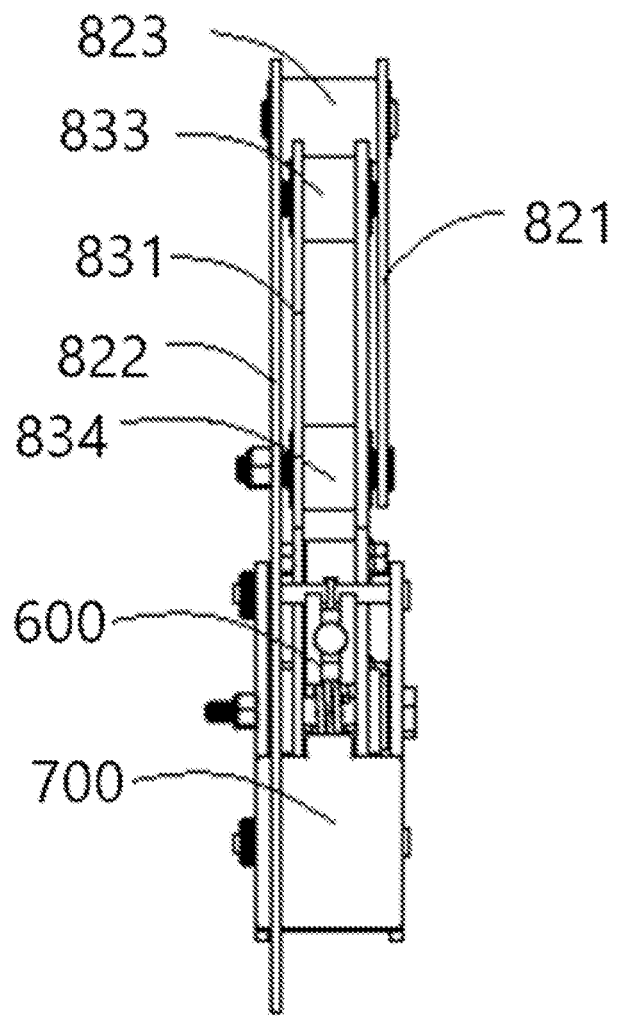
FIG. 32 is a view of the example first and second linkages connected together.
Figure 33:
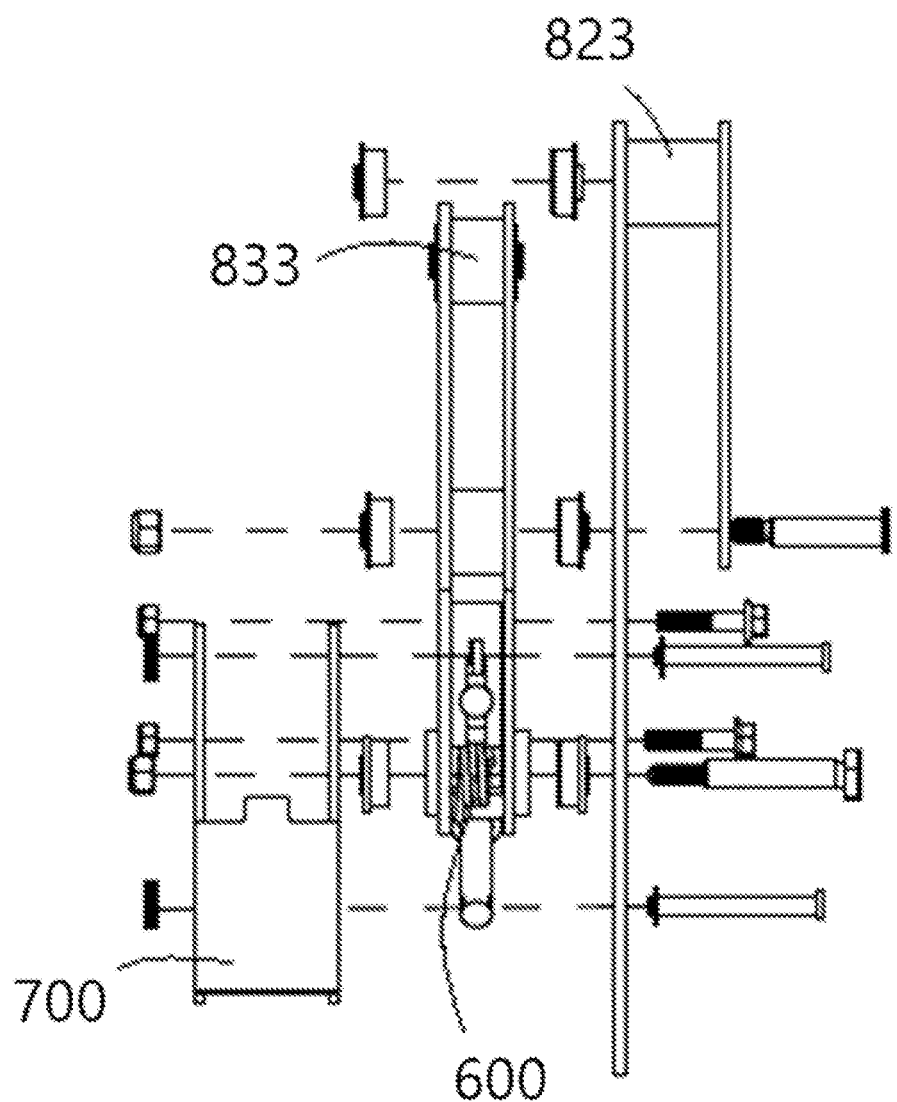
FIG. 33 is an exploded view of the example first and second linkages.
Figure 34:
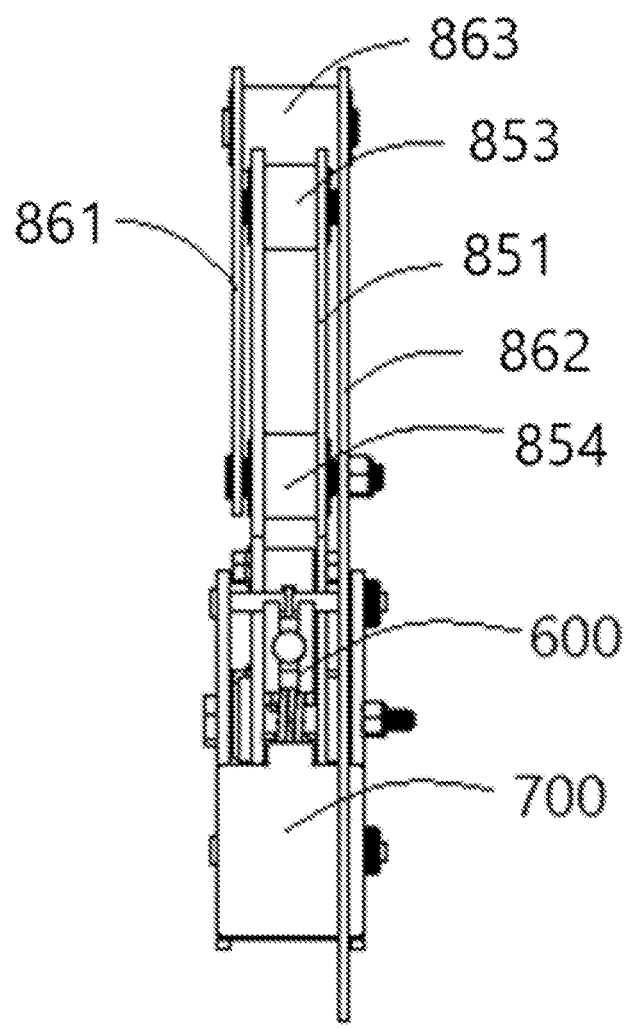
FIG. 34 is a view of a third and fourth linkage connected together.
Figure 35:
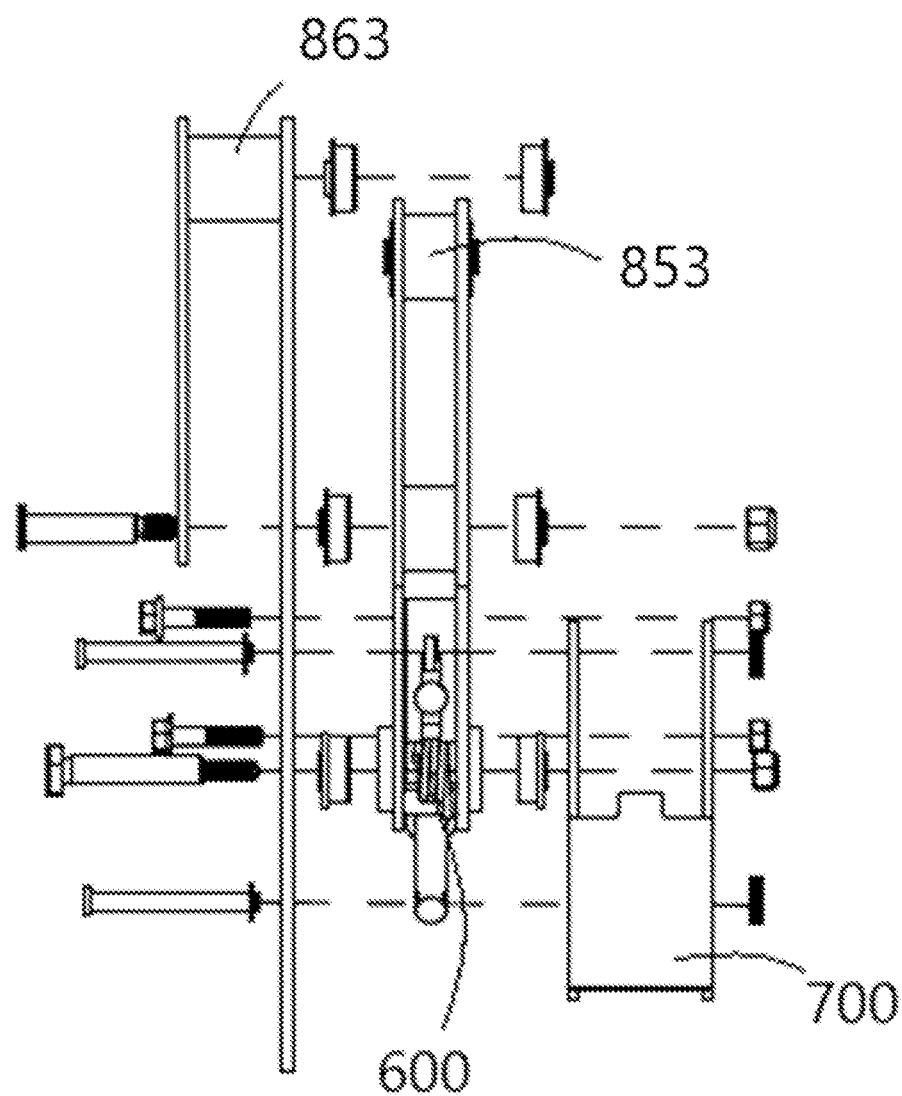
FIG. 35 is an exploded view of a third and fourth linkage.

FIG. 32 illustrates the second linkage 830 connected to the first linkage 820. FIG. 33 is an exploded view thereof. As shown in the figures, the second linkage 830 has a pin type pin connection with the first linkage 820 and supports the dibbler 600 and pivotally supports the pivot arm 700. As mentioned above, linkages 850 and 860 may be substantially identical to linkages 820 and 830. FIG. 34 illustrates the third linkage 850 and the fourth linkage 860 connected together. Like linkage 830, linkage 850 also supports a dibbler and pivotally supports a pivot arm 700. FIG. 35 is an exploded view of linkages 850 and 860.

Figure 36:
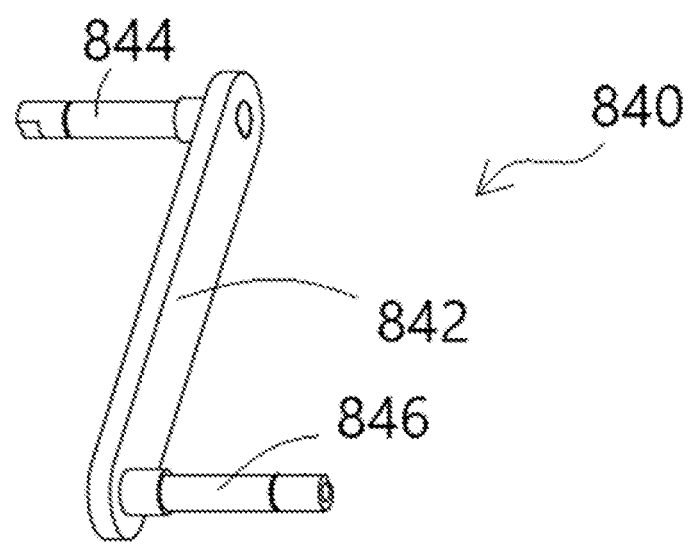
FIG. 36 is a view of an example crank link.

FIG. 36 is view of a crank link 840. Crank link 840 may connect the second linkage 830 to the third linkage 850. For example, crank link 840 may have a body 842 having a first protection 844 and a second projection 846. The first projection 844 may insert into sleeve 833 of the second linkage 830 and the second projection 846 may insert into the sleeve 853 of the third linkage 850. Thus, as the motor operates and the sprocket 884 turns the drive link 860 causes the second linkage 830 to rotate (as well as the first linkage 820 due to the pinned connection) and the crank link 840 transfers force to the third linkage 850 to turn the third linkage 850 as well. Due to the manner in which the various elements are connected, one of the dibblers 600 is moved upwards to receive a seed while another is moved downwards to deposit a seed into the ground.

Figure 37:
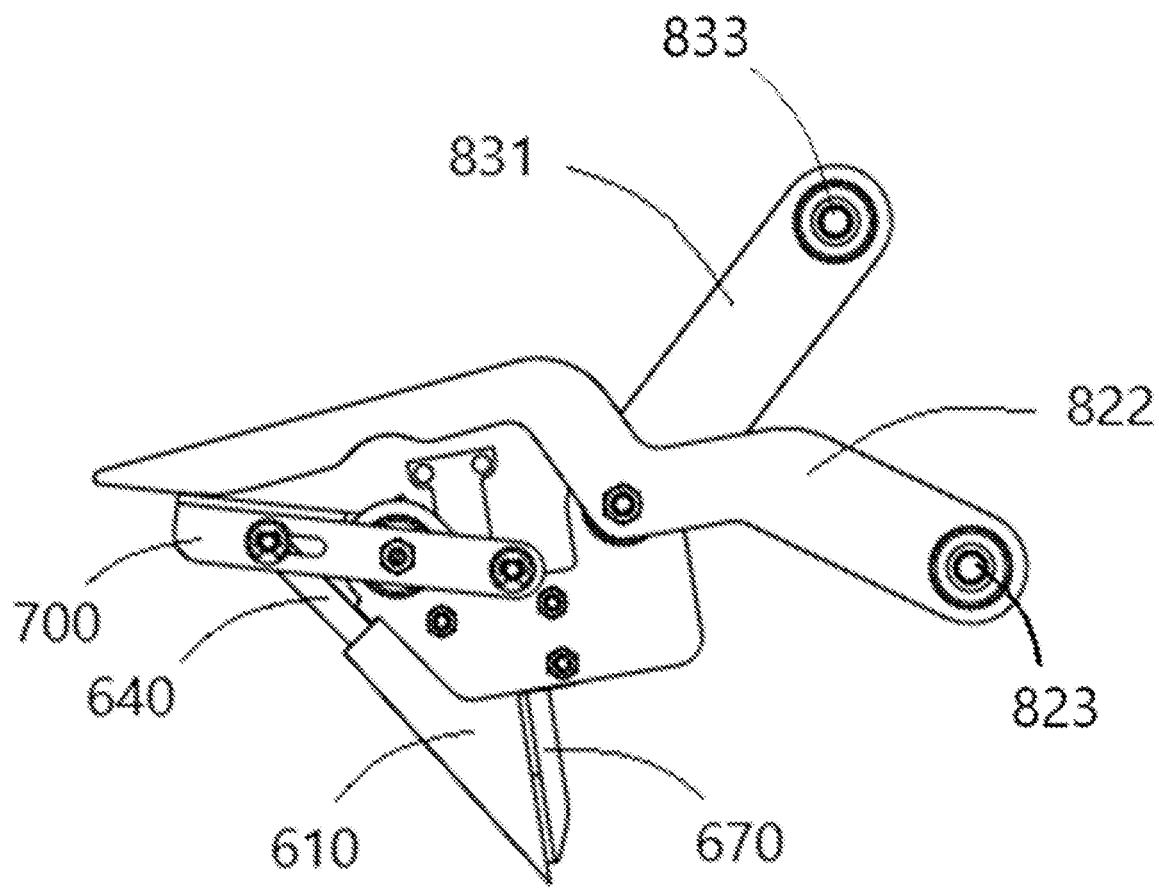
FIG. 37 illustrates an example of a first linkage connected to a second linkage that supports a dibbler and a pivot arm.
Figure 38:
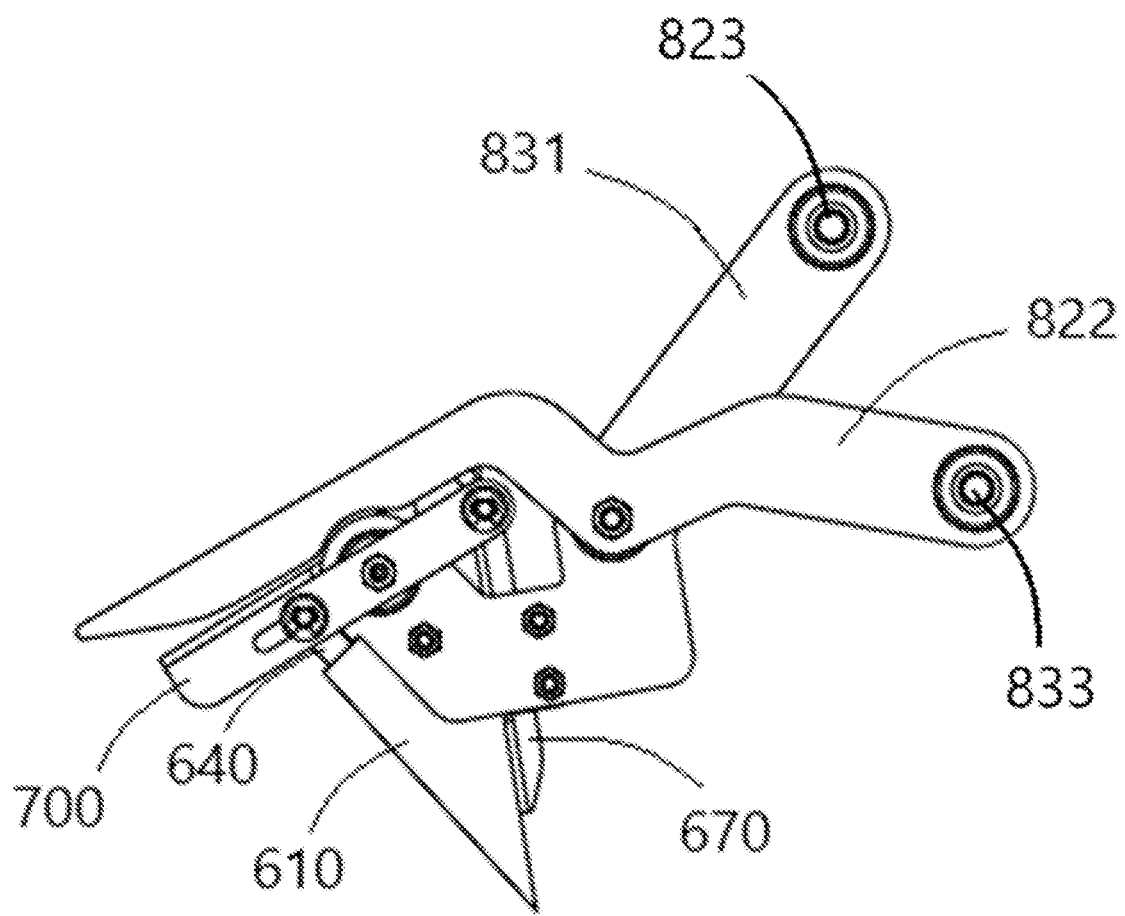
FIG. 38 illustrates another example of a first linkage connected to a second linkage that supports a dibbler and a pivot arm.
Figure 39:
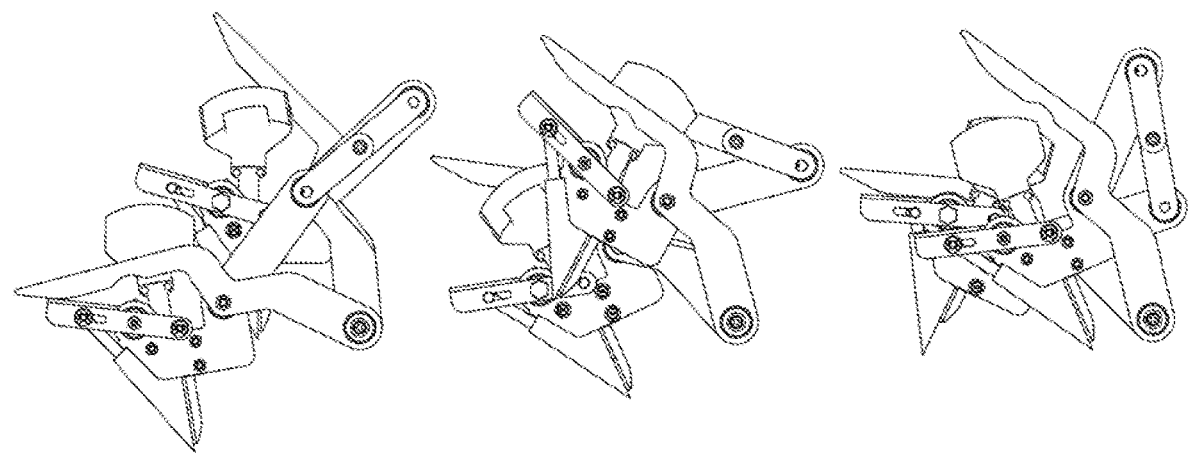
FIG. 39 illustrates an example of a various linkages in various configurations.

FIGS. 37 and 38 illustrate motions of the first and second linkages 820 and 830 as the motor operates. FIG. 37 illustrates a configuration of the linkages 820 and 830 at one point in time. In FIG. 37 the first linkage 820 is pinned at 823 via the restraining rod 810 and the first and second linkages 820 and 830 are pinned together by a connection 829 which may be some type of bolt nut or other pin type connection. The second linkage 830 is connected to the drive link at 860 at 833. As the drive link 860 rotates the second linkage 830 is moved upwards and downwards. On the downward stroke the dibbler 600 is pushed into the ground and shortly thereafter the first link 820 contacts the receiving plate 730 of the pivot arm 700 to push it downwards. This action causes the pivot arm 700 to pivot thereby causing the gate 670 to move upwards to expose the seed exit aperture 620 and the pushpin 640 to move through the second channel 622 to cause the seed to eject from the seed exit aperture 620. As drive link 860 continues to rotate the first linkage 820 pulls away from the pivot arm 700 and the dibbler 600 is moved upwards to collect a seed from the seed meter 900. As the drive link 860 continues to operate the dibbler 600 is then moved down again and the above steps are repeated to plant a plurality of seeds. It is noted linkages 850 and 860 undergo similar operations.

Figure 40:
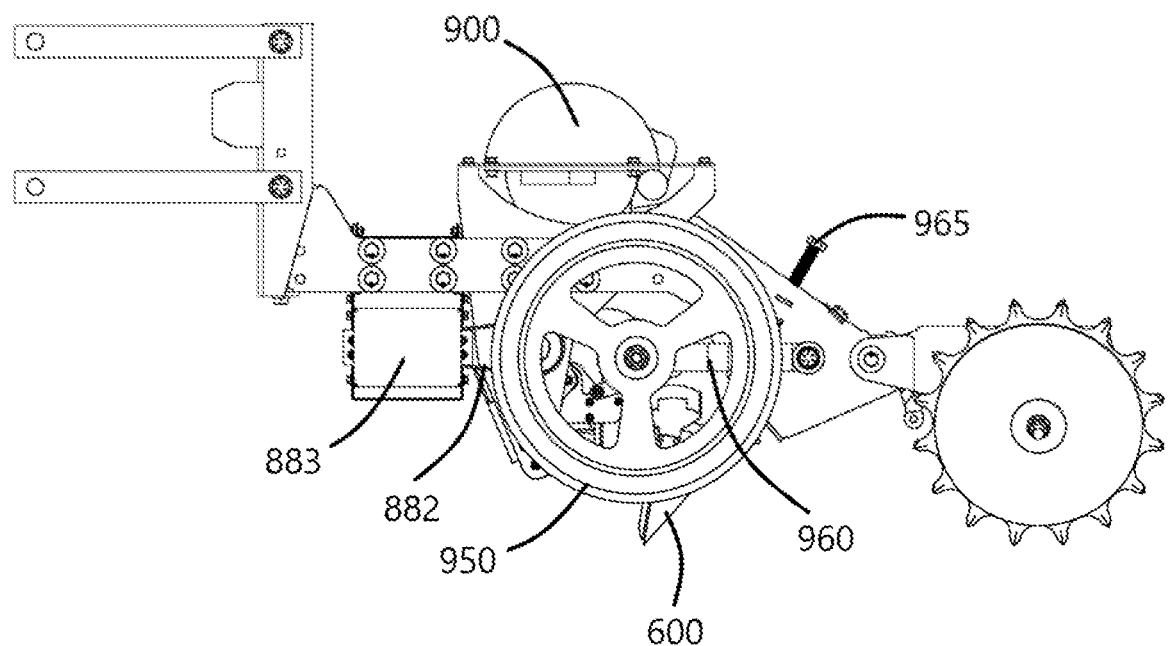
FIG. 40 illustrates a view of a planter system in accordance with an example embodiment.
Figure 41:
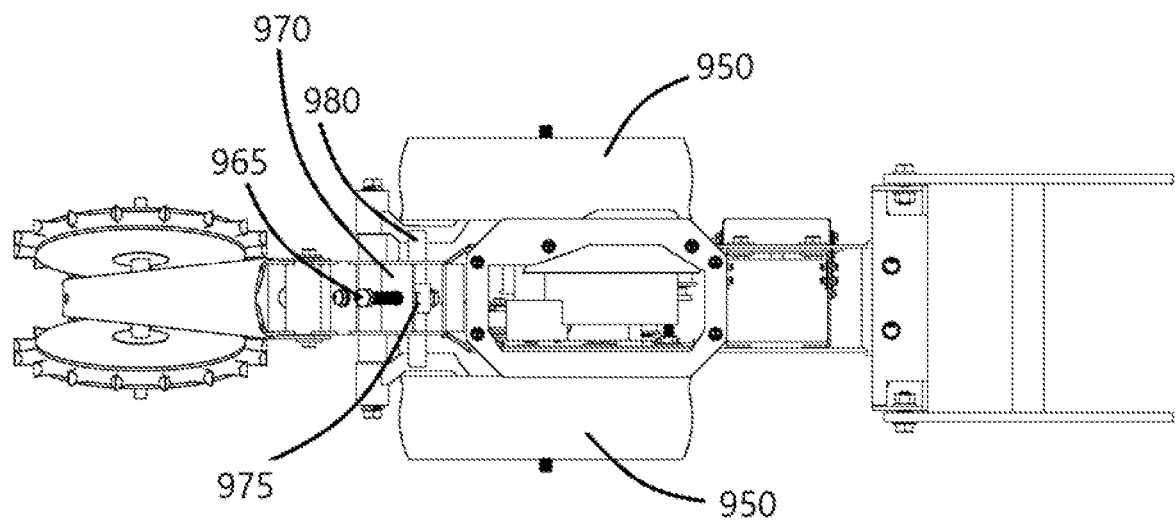
FIG. 41 illustrates another view of planter system in accordance with an example embodiment.

Various modifications to the above disclosure are considered to fall within the inventive concepts. For example, FIG. 40 illustrates additional concepts usable with the above disclosure. For example, planter unit 1000 may include a gage wheels 950 to control a depth of planting. In FIG. 40, for example, the illustrated system includes the previously describe motor 883, energy transfer member 882, along with the other members of system 1000 in addition to the illustrated gage wheels 950. In FIGS. 40 and 41, the gage wheels 950 are pinned to a frame and the gage arms 960 are controlled by a gage wheel control system. The gage wheel control system uses a threaded member 965 that passes through a threaded block 970 which is fixed to the frame and generally not movable with respect to the frame. In the nonlimiting example of FIGS. 40 and 41, an end of the threaded member 965 connects to a tubular member which supports a bar 980 which presses against the gage arms 960. As the threaded member 965 is turned the bar 980 moves up and down depending on if the threaded member 965 is turned clockwise or counter clockwise. This, of course, affects the angle of the gage arms 960 which affects the orientation of the gage wheel 950. Unlike conventional systems, the threaded member 965 allows for an infinite adjustment of the gage wheel 950. Though not shown in the figures, one skilled in the art would understand the sides of the framed would have slots for the bar 980 to engage the gage wheel arms 960 outside the frame to move up and down the gage wheel arms 960 to adjust a height of the gage wheel.

What we claim is:
1. A dibbler comprising:
  a body having a seed entrance aperture configured to receive a seed, a seed exit aperture configured to allow the seed to exit the body, and a first channel configured allow the seed to travel from the seed entrance aperture to the seed exit aperture;
  a push pin inclined from the horizontal and arranged in a second channel of the body, the push pin being configured to push the seed out the seed exit aperture; and a sliding member arranged in a third channel of the body to block and expose the seed exit aperture.

2. The dibbler of claim 1, wherein the push pin directly pushes the seed out of the seed exit aperture.

\* \* \* \* \*